US012701191B2

(12) United States Patent
Giagnocavo

(10) Patent No.: US 12,701,191 B2
(45) Date of Patent: Aug. 4, 2026

(54) Z-AXIS INFORMATION FOR VOICE OVER INTERNET PROTOCOL (VOIP)

(71) Applicant: CenturyLink Intellectual Property LLC, Denver, CO (US)

(72) Inventor: Patrick Giagnocavo, Littleton, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 313 days.

(21) Appl. No.: 18/660,538

(22) Filed: May 10, 2024

(65) Prior Publication Data

US 2025/0203013 A1     Jun. 19, 2025

Related U.S. Application Data

(60) Provisional application No. 63/611,877, filed on Dec. 19, 2023.

(51) Int. Cl.
H04M 7/00 (2006.01)
(52) U.S. Cl.
CPC ...... H04M 7/0081 (2013.01); H04M 2242/04 (2013.01)
(58) Field of Classification Search
CPC .......................... H04M 7/0081; H04M 2242/04

USPC ......................................................... 370/352
See application file for complete search history.

(56) References Cited

U.S. PATENT DOCUMENTS

| 11,445,354 | B1 * | 9/2022 | Brosowsky | ............. | H04W 4/80 |
| 2016/0274214 | A1 * | 9/2016 | Crilly, Jr. | ................ | H04W 4/33 |
| 2021/0176618 | A1 * | 6/2021 | Finger | .................. | H04W 4/025 |

* cited by examiner

*Primary Examiner* — Jirapon Tulop

(57) ABSTRACT

Novel tools and techniques are provided for implementing z-axis information for voice over Internet Protocol ("VoIP"). In various embodiments, a user device or location beacon having geo-location system access or having sensors or devices for obtaining z-axis information is used to provide z-axis information to a nearby VoIP telephone. The user device or location beacon may send a dial-triggering signal that causes the VoIP telephone (in its off-hook state) to dial a telephone number corresponding to a 911 or E911 address database system. After the 911 or E911 address database system indicates that it is ready to receive z-axis information, the user device or location beacon sends a z-axis data signal containing the current z-axis information to the VOIP telephone, which extracts the current z-axis information for sending to the 911 or E911 address database system for updating the 911 or E911 address associated with the VoIP telephone.

20 Claims, 12 Drawing Sheets

*Time t = t₀*

*Time t = tₚ*

400A

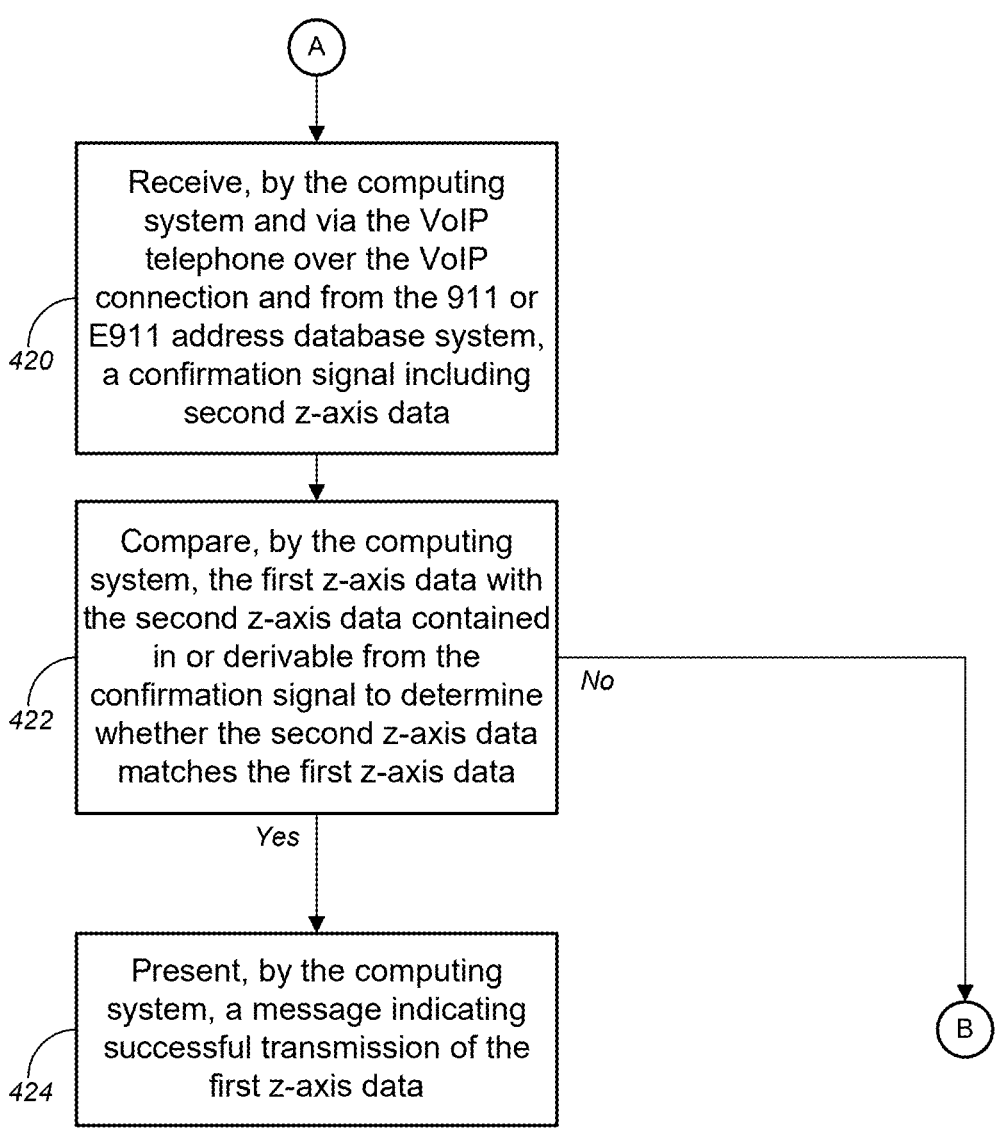

420 Receive, by the computing system and via the VoIP telephone over the VoIP connection and from the 911 or E911 address database system, a confirmation signal including second z-axis data 422 Compare, by the computing system, the first z-axis data with the second z-axis data contained in or derivable from the confirmation signal to determine whether the second z-axis data matches the first z-axis data No Yes 424 Present, by the computing system, a message indicating successful transmission of the first z-axis data

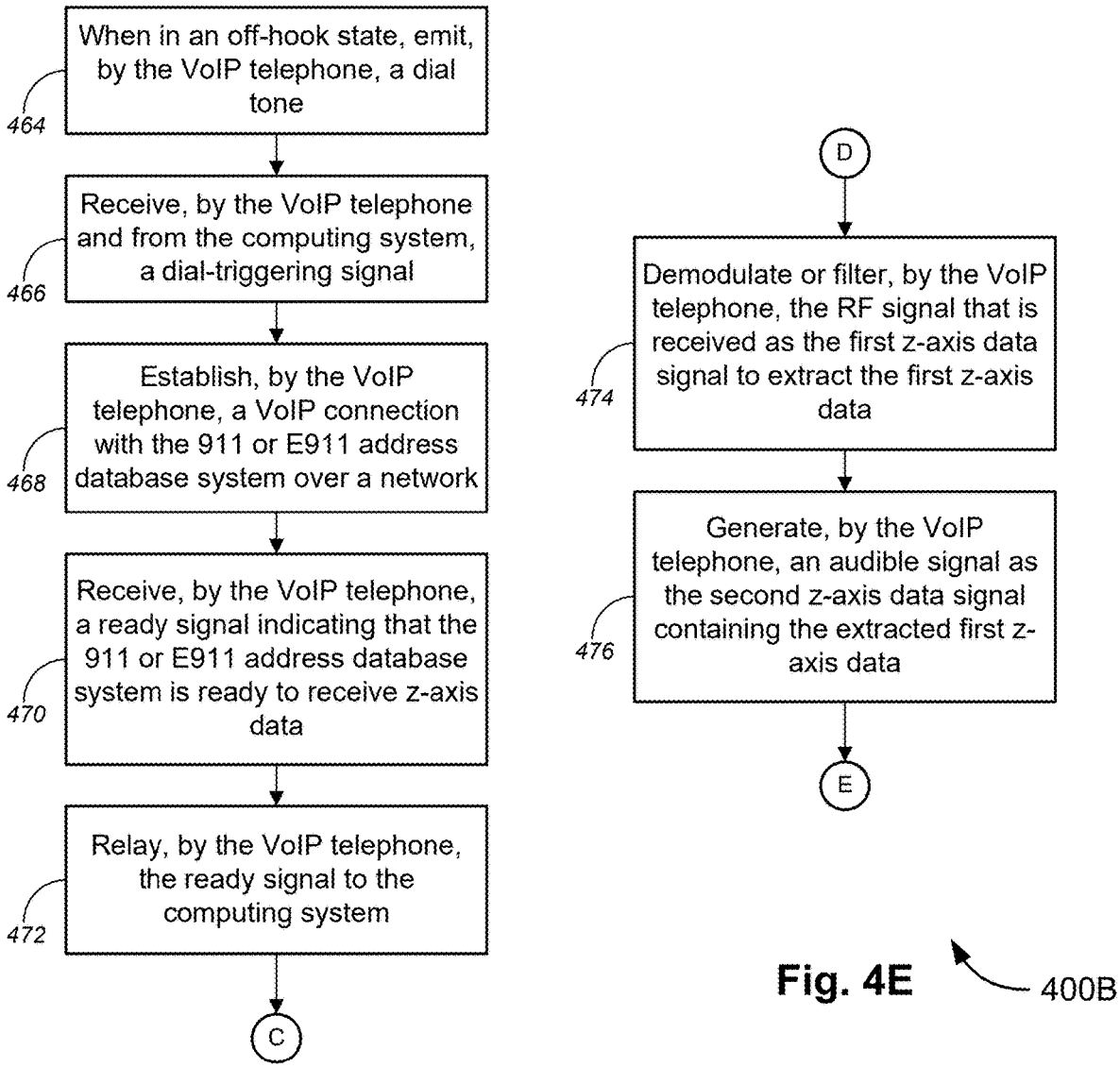

464 — When in an off-hook state, emit, by the VoIP telephone, a dial tone

466 — Receive, by the VoIP telephone and from the computing system, a dial-triggering signal 468 — Establish, by the VoIP telephone, a VoIP connection with the 911 or E911 address database system over a network 470 — Receive, by the VoIP telephone, a ready signal indicating that the 911 or E911 address database system is ready to receive z-axis data 472 — Relay, by the VoIP telephone, the ready signal to the computing system

C

474 — Demodulate or filter, by the VoIP telephone, the RF signal that is received as the first z-axis data signal to extract the first z-axis data 476 — Generate, by the VoIP telephone, an audible signal as the second z-axis data signal containing the extracted first z-axis data

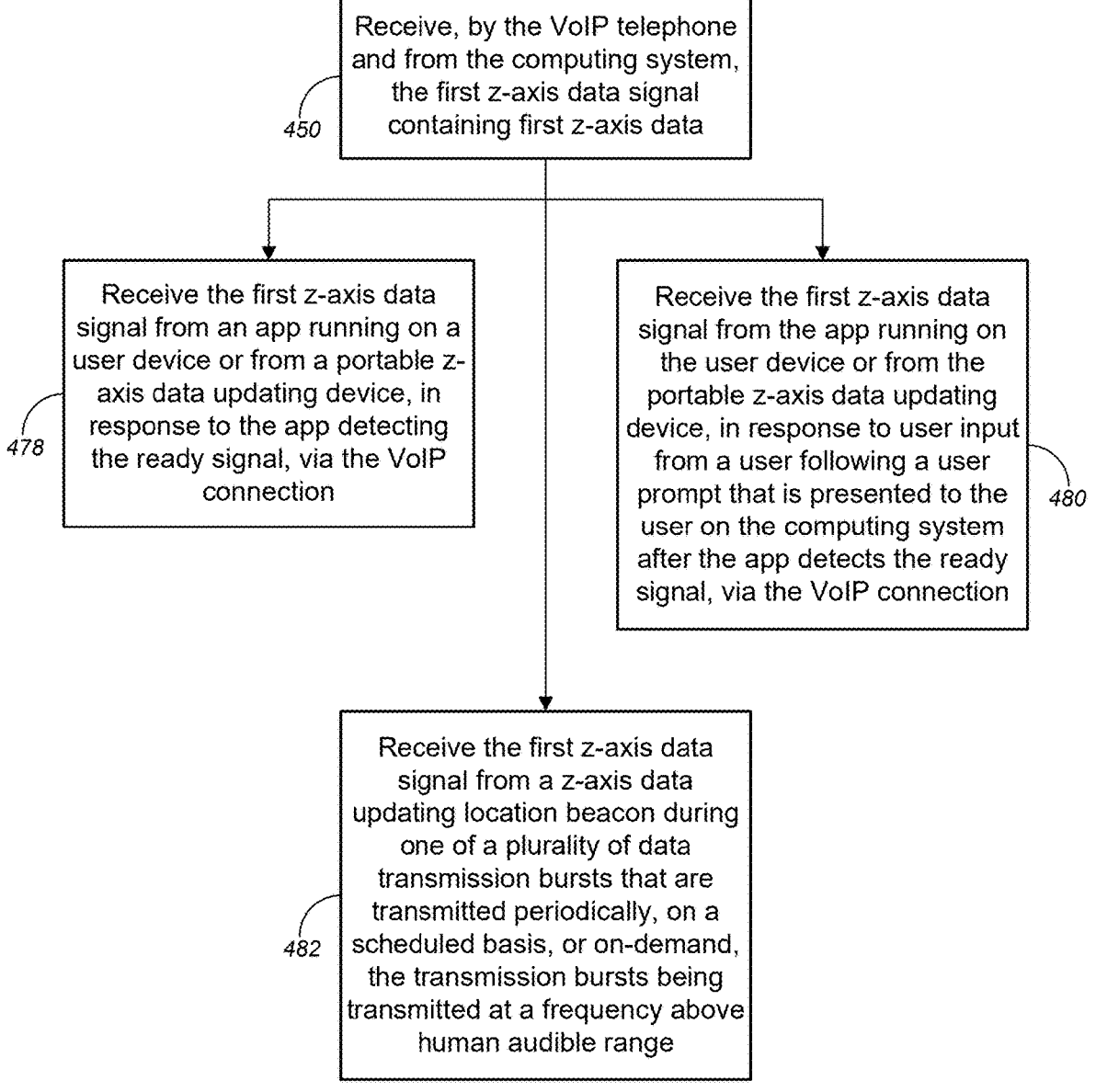

Receive, by the VoIP telephone and from the computing system, the first z-axis data signal containing first z-axis data

450

Receive the first z-axis data signal from an app running on a user device or from a portable z-axis data updating device, in response to the app detecting the ready signal, via the VoIP connection

478

Receive the first z-axis data signal from the app running on the user device or from the portable z-axis data updating device, in response to user input from a user following a user prompt that is presented to the user on the computing system after the app detects the ready signal, via the VoIP connection

480

Receive the first z-axis data signal from a z-axis data updating location beacon during one of a plurality of data transmission bursts that are transmitted periodically, on a scheduled basis, or on-demand, the transmission bursts being transmitted at a frequency above human audible range

Z-AXIS INFORMATION FOR VOICE OVER INTERNET PROTOCOL (VOIP)

CROSS-REFERENCE TO RELATED APPLICATIONS

This application claims the benefit of U.S. Provisional Application No. 63/611,877 filed Dec. 19, 2023, entitled "Z-Axis Information for Voice Over Internet Protocol (VOIP)," which is incorporated herein by reference in its entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing public safety service point ("PSAP") operations and functionalities and/or 911 or enhanced 911 ("E911") address updating operations, and, more particularly, to methods, systems, and apparatuses for implementing z-axis information for voice over Internet Protocol ("VoIP").

BACKGROUND

Z-axis information is used in mobile phones to provide essential location information, including height, altitude, or other vertical location information to supplement or complement 911 or E911 address information corresponding to the telephone number of a particular mobile phone. Such information can be used to estimate a floor on which the caller requesting emergency aid may be located within a multistory building. Although the U.S. Federal Communications Commission ("FCC") has tasked the major mobile network carriers in the U.S. with improving z-axis identification for use in 9-1-1 calls, such mandate is applicable to mobile phones. VoIP phones, however, are under no such mandate, thus leaving VoIP phone-based 911 or E911 addresses lacking in appropriate z-axis identification or information. It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIGS. 4A-4F depict flow diagrams illustrating various example methods for implementing z-axis information for VoIP, in accordance with various embodiments.

DETAILED DESCRIPTION OF CERTAIN EMBODIMENTS

Overview

Figure 1:
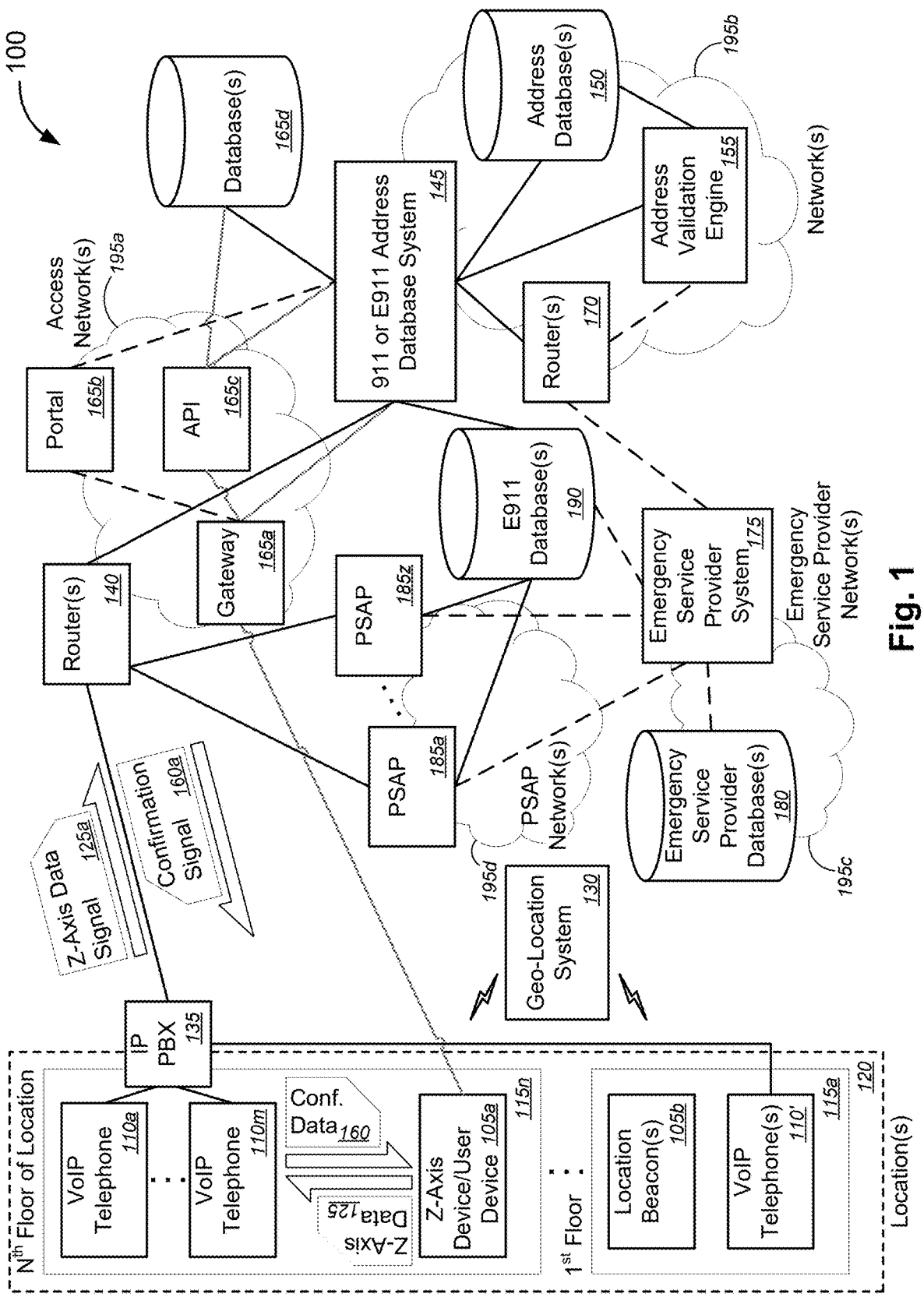
FIG. 1 depicts an example system for implementing z-axis information for voice over Internet Protocol ("VoIP"), in accordance with various embodiments.

Various embodiments provide tools and techniques for implementing public safety service point ("PSAP") operations and functionalities and/or 911 or enhanced 911 ("E911") address updating operations, and, more particularly, to methods, systems, and apparatuses for implementing z-axis information for voice over Internet Protocol ("VoIP").

In various embodiments, a user device or location beacon having geo-location system access or having sensors or devices for obtaining lateral (or x-y coordinate) location information as well as z-axis information may be used to provide such current location information (including z-axis information) to a VoIP telephone that is in proximity to the user device or location beacon. In some cases, the user device or location beacon may send a dial-triggering signal to the VoIP telephone when the VoIP telephone is in an off-hook state, the dial-triggering signal causing the VoIP telephone to dial a telephone number corresponding to a 911 or E911 address database system. After the 911 or E911 address database system sends a ready signal indicating that it is ready to receive z-axis information, the user device or location beacon sends a first z-axis data signal containing the current z-axis information to the VoIP telephone, which decodes the first z-axis data signal to extract the current z-axis information for sending to the 911 or E911 address database system for updating the 911 or E911 address associated with the VoIP telephone.

In this manner, VoIP telephones may be provided with z-axis information for their 911 or E911 addresses, thereby improving safety or emergency responses to users in multistory buildings or locations who make 9-1-1 calls using VoIP telephones. These and other aspects of implementing z-axis information for VoIP are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values, etc.).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Aspects of the present invention, for example, are described below with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

In an aspect, the technology relates to a method, including sending, by a computing system and to a voice over Internet protocol ("VOIP") telephone, a dial-triggering signal to cause the VoIP telephone to dial a telephone number corresponding to a 911 or E911 address database system. The method further includes generating, by the computing system, a first z-axis data signal containing first z-axis data corresponding to a location of the computing system that is proximate to a current location of the VoIP telephone, based on z-axis data obtained from a z-axis data source associated with the computing system. The method further includes sending, by the computing system, the first z-axis data signal to the VoIP telephone for transmission as a second z-axis data signal to the 911 or E911 address database system for decoding the second z-axis data signal to obtain the first z-axis data and for updating a first 911 or E911 address with the first z-axis data, the first 911 or E911 address being associated with a telephone number of the VoIP telephone.

In some embodiments, the computing system includes one of a z-axis data updating software application ("app") running on a user device, a z-axis data updating location beacon, or a portable z-axis data updating device, and/or the like. In some instances, the user device includes one of a smart phone, a tablet computer, or a laptop computer, and/or the like. In some cases, the VoIP telephone includes one of a wired VoIP telephone, a table-top VoIP telephone, a counter-top VoIP telephone, a wall-mounted VoIP telephone, a VoIP conferencing telephone, or a cordless VoIP telephone, and/or the like. In some examples, the dial-triggering signal includes one of a dual-tone multi-frequency ("DTMF") signal or a frequency shift keying ("FSK") signal. In examples, the 911 or E911 address database system includes at least one of an emergency call record system, an address validation system, or an interactive voice response ("IVR") system for an address database, and/or the like.

According to some embodiments, the method further includes detecting, by the computing system, a dial tone emitting from the VoIP telephone. In some instances, sending the dial-triggering signal includes one of sending, by the computing system and to the VoIP telephone, the dial-triggering signal in response to detecting the dial tone; or, in response to detecting the dial tone, prompting, by the computing system, a user to initiate sending the dial-triggering signal, wherein sending the dial-triggering signal is performed in response to receiving user input indicating to initiate sending the dial-triggering signal. In examples, the user input includes one of a tactile input selecting an option to send the dial-triggering signal, a voice input indicating to initiate sending the dial-triggering signal, or a gesture input indicating to initiate sending the dial-triggering signal, and/or the like.

In some examples, the method further includes detecting, by the computing system, a ready signal indicating that the 911 or E911 address database system is ready to receive z-axis data. In such cases, generating and sending the first z-axis data signal are performed in response to detecting the ready signal. In some embodiments, generating and sending the first z-axis data signal includes modulating, by the computing system, a radio frequency ("RF") signal as a carrier signal to carry the first z-axis data. In some cases, the RF signal is one of a radio teletype ("RTTY")-based signal, an FSK-based signal, a phase shift keying ("PSK")-based signal, or a DTMF signal, and/or the like. In examples, generating and sending the first z-axis data signal includes sending, by the computing system, the RF signal modulated to carry the first z-axis data for the VOIP telephone to extract the first z-axis data and to send the z-axis data as the second z-axis data signal to the 911 or E911 address database system. According to some embodiments, the first z-axis data is encoded as a first data signal represented by at least two tones, based on a signal encoding scheme corresponding to the RF signal that is modulated as the carrier signal to carry the first z-axis data. In some instances, extracting the z-axis data at the VoIP telephone includes demodulating the RF signal to extract the first data signal represented by the at least two tones and filtering the first data signal to obtain the first z-axis data.

In examples, the z-axis data source includes one of a geo-location system, an altimeter, a barometer, or an inertial measurement unit ("IMU")-based inertial navigation system, and/or the like. In some cases, the z-axis data includes at least one of height above ellipsoid ("HAE") data, altitude data, atmospheric pressure data, or altitude data based on tracked motion, acceleration, and orientation, and/or the like.

In some embodiments, the method further includes receiving, by the computing system and from the 911 or E911 address database system via the VoIP telephone, a confirmation signal. In examples, the confirmation signal includes one of a text-to-speech generated verbal recitation of the first z-axis data, a third z-axis data signal that is generated based on the first z-axis data that is received via the second z-axis data signal by the 911 or E911 address database system, or a signal containing a check-sum value corresponding to the first z-axis data that is received via the second z-axis data signal by the 911 or E911 address database system, and/or the like. The method further includes comparing, by the computing system, the first z-axis data with z-axis data contained in or derivable from the confirmation signal. In an example, the method further includes, based on determination that the z-axis data contained in or derivable from the confirmation signal matches the first z-axis data, presenting, by the computing system, a message indicating successful transmission of the first z-axis data. Alternatively, in another example, the method further includes, based on determination that the z-axis data contained in or derivable from the confirmation signal does not match the first z-axis data, repeating the processes of sending the second z-axis data signal, receiving the confirmation signal, and comparing the z-axis data contained in or derivable from the confirmation signal.

In another aspect, the technology relates to a method, including receiving, by a VoIP telephone and from a computing system, a first z-axis data signal containing first z-axis data corresponding to a location of the computing system that is proximate to a current location of the VoIP telephone, based on z-axis data obtained from a z-axis data source associated with the computing system. The method further includes, when a VoIP connection has been established with a 911 or E911 address database system over a network, sending, by the VoIP telephone and to the 911 or E911 address database system, a second z-axis data signal containing the first z-axis data that is extracted from the first z-axis data signal. The method further includes receiving, by the VoIP telephone and from the 911 or E911 address database system, a confirmation signal including second z-axis data; and sending, by the VoIP telephone and to the computing system, the confirmation signal for comparing the first z-axis data with the second z-axis data contained in or derivable from the confirmation signal.

In some embodiments, the computing system includes one of a z-axis data updating app running on a user device, a z-axis data updating location beacon, or a portable z-axis data updating device, and/or the like. In some instances, the user device includes one of a smart phone, a tablet computer, or a laptop computer, and/or the like. In some cases, the VoIP telephone includes one of a wired VoIP telephone, a table-top VoIP telephone, a counter-top VoIP telephone, a wall-mounted VoIP telephone, a VoIP conferencing telephone, or a cordless VoIP telephone, and/or the like.

According to some embodiments, the method further includes storing, by the VoIP telephone and on a local data storage device, at least one of the first z-axis data signal or the first z-axis data that is extracted from the first z-axis data signal. In some examples, sending the second z-axis data signal to the 911 or E911 address database system includes, when the VoIP connection has been established with the 911 or E911 address database system over the network, retrieving, by the VoIP telephone and from the local data storage device, the at least one of the first z-axis data signal or the first z-axis data, generating, by the VoIP telephone, the second z-axis data signal containing the first z-axis data that either is extracted from the retrieved first z-axis data signal or is directly retrieved from the local data storage device, and sending, by the VoIP telephone and to the 911 or E911 address database system over the VoIP connection, the second z-axis data signal.

In an example, receiving the first z-axis data signal includes receiving the first z-axis data signal from an app running on a user device or from a portable z-axis data updating device, in response to the app detecting a ready signal, via the VoIP connection, indicating that the 911 or E911 address database system is ready to receive z-axis data. Alternatively, in another example, receiving the first z-axis data signal includes receiving the first z-axis data signal from the app running on the user device or from the portable z-axis data updating device, in response to user input from a user following a user prompt that is presented to the user on the computing system after the app detects the ready signal, via the VoIP connection. Alternatively, in yet another example, receiving the first z-axis data signal includes receiving the first z-axis data signal from a z-axis data updating location beacon during one of a plurality of data transmission bursts that are transmitted periodically, on a scheduled basis, or on-demand. In some cases, the first z-axis data signal that is received from the z-axis data updating location beacon is transmitted at a frequency above human audible range. In examples, the user device or the z-axis data updating location beacon is proximate to, and within audible signal pickup range of, the VoIP telephone.

In examples, the first z-axis data signal that is received from the computing system is an RF signal that has been modulated as a carrier signal to carry the first z-axis data, wherein the RF signal is one of a RTTY-based signal, an FSK-based signal, a PSK-based signal, or a DTMF signal. In some examples, the method further includes demodulating or filtering, by the VoIP telephone, the RF signal that is received as the first z-axis data signal to extract the first z-axis data; and generating, by the VoIP telephone, an audible signal as the second z-axis data signal containing the extracted first z-axis data. In such cases, sending the second z-axis data signal includes sending the generated audible signal.

According to some embodiments, the method further includes, when in an off-hook state, emitting, by the VoIP telephone, a dial tone; and receiving, by the VoIP telephone and from the computing system, a dial-triggering signal that is sent by the computing system after detecting the dial tone. In some instances, the dial-triggering signal includes one of a DTMF signal or an FSK signal. In some cases, the dial-triggering signal is sent autonomously or in response to user input from a user following a user prompt that is presented to the user on the computing system after the computing system detects the dial tone.

In yet another aspect, the technology relates to a z-axis data updating system, including a z-axis data source that is configured to obtain current z-axis data; a data storage system that is configured to store z-axis data; a signal generator that is configured to generate signals containing or encoded with z-axis data; a transceiver; and a computing system. The computing system is configured to generate, using the signal generator, a first z-axis data signal containing first z-axis data corresponding to a location of the z-axis data updating system, based on current z-axis data obtained from at least one of the z-axis data source or the data storage system. The computing system is further configured to send, using the transceiver, a first z-axis data signal to a VoIP telephone that is proximate to the z-axis data updating system, for transmission as a second z-axis data signal via the VoIP telephone over a VoIP connection over a network to a 911 or E911 address database system for decoding the second z-axis data signal to obtain the first z-axis data and for updating a first 911 or E911 address with the first z-axis data, the first 911 or E911 address being associated with a telephone number of the VoIP telephone.

In examples, the z-axis data updating system further includes one of a user device running a z-axis data updating app, a z-axis data updating location beacon, or a portable z-axis data updating device, and/or the like. In some instances, the user device includes one of a smart phone, a tablet computer, or a laptop computer, and/or the like. In some cases, the VoIP telephone includes one of a wired VoIP telephone, a table-top VoIP telephone, a counter-top VoIP telephone, a wall-mounted VoIP telephone, a VoIP conferencing telephone, or a cordless VoIP telephone, and/or the like. In some examples, the 911 or E911 address database system includes at least one of an emergency call record system, an address validation system, or an IVR system for an address database, and/or the like. In examples, the z-axis data source includes one of a geo-location system, an altimeter, a barometer, or an IMU-based inertial navigation system, and/or the like. In some examples, the z-axis data includes at least one of HAE data, altitude data, atmospheric pressure data, or altitude data based on tracked motion, acceleration, and orientation, and/or the like.

In an example, the computing system is further configured to send, to the VoIP telephone, a dial-triggering signal to cause the VoIP telephone to dial a telephone number corresponding to the 911 or E911 address database system, after detecting a dial tone from the VoIP telephone. In some cases, the dial-triggering signal includes one of a DTMF signal or an FSK signal. Alternatively, in another example, the computing system is further configured to detect, via the VoIP telephone over the VoIP connection, a ready signal from the 911 or E911 address database system indicating that the 911 or E911 address database system is ready to receive z-axis data. In such cases, generating and sending the first z-axis data signal are performed after detecting the ready signal. Alternatively, in yet another example, the computing system is further configured to receive, via the VoIP telephone over the VoIP connection and from the 911 or E911 address database system, a confirmation signal including second z-axis data, and compare the first z-axis data with the second z-axis data contained in or derivable from the confirmation signal. In an instance, the computing system is further configured to, based on determination that the second z-axis data contained in or derivable from the confirmation signal matches the first z-axis data, present, on a display screen or over a speaker of the z-axis data updating system, a message indicating successful transmission of the first z-axis data. Alternatively, in another instance, the computing system is further configured to, based on determination that the second z-axis data contained in or derivable from the confirmation signal does not match the first z-axis data, repeat the processes of sending the first z-axis data signal, receiving the confirmation signal, and comparing the first z-axis data with the second z-axis data contained in or derivable from the confirmation signal.

Various modifications and additions can be made to the embodiments discussed without departing from the scope of the invention. For example, while the embodiments described above refer to particular features, the scope of this invention also includes embodiments having different combination of features and embodiments that do not include all of the above-described features.

Specific Exemplary Embodiments

We now turn to the embodiments as illustrated by the drawings. FIGS. 1-5 illustrate some of the features of the method, system, and apparatus for implementing PSAP operations and functionalities and/or 911 or E911 address updating operations, and, more particularly, to methods, systems, and apparatuses for implementing z-axis information for VoIP, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 depicts an example system 100 for implementing z-axis information for VoIP, in accordance with various embodiments. In the non-limiting embodiment of FIG. 1, system 100 may include portable z-axis device(s) or user device(s) 105a, location beacon(s) 105b, and VoIP telephones 110a-110m and 110' (collectively, "VOIP telephones 110" or the like) that are located at particular floors 115a-115n of a location(s) 120. For example, as shown in FIG. 1, location beacon(s) 105b may be in proximity to VoIP telephone 110' on the first floor 115a of a multi-story building at location 120. On the $N^{th}$ floor 115n of the building at location 120, portable z-axis device(s) or user device(s) 105a may be in proximity to one or more VOIP telephones 110a-110m. In examples, the portable z-axis device(s) 105a may be a device that is used by a service provider technician to perform field updating of 911 or E911 addresses (including z-axis information) for VoIP telephones, while the user device(s) 105a may be used by a customer, the service provider technician, or other user and may each include one of a smart phone, a tablet computer, or a laptop computer, and/or the like. In some examples, an app may be run or executed on the portable z-axis device(s) or user device(s) 105a, the app being used to update z-axis information or data in 911 or E911 addresses for VoIP telephones, as described in detail below. In some cases, the VOIP telephones 110 may each include one of a wired VoIP telephone, a table-top VoIP telephone, a counter-top VoIP telephone, a wall-mounted VoIP telephone, a VoIP conferencing telephone, or a cordless VoIP telephone, and/or the like.

In examples, the portable z-axis device(s) or user device(s) 105a provides z-axis data 125 from a z-axis data source including external systems (e.g., geo-location system 130, or the like) or on-board sensors or devices (including an altimeter, a barometer, or an IMU-based inertial navigation system, and/or the like). In a similar manner, location beacon(s) 105b likewise provides z-axis data 125 from the z-axis data source or on-board sensors or devices. In some cases, the z-axis data includes at least one of HAE data, altitude data, atmospheric pressure data, or altitude data based on tracked motion, acceleration, and orientation, and/or the like. VoIP telephones typically do not include such connections to external systems nor include such on-board sensors or devices, and thus portable z-axis device(s) or user device(s) 105a or location beacon(s) 105b is (are) used to provide the z-axis data 125. A VoIP telephone 110—which is provided with z-axis data 125, techniques of which are described and shown below with respect to FIGS. 2-4—may establish a VoIP or network connection with 911 or E911 address database system 145 in a network (e.g., network(s) 195b, or the like), via an Internet Protocol private branch exchange ("IP PBX") 135 that may service location 120, and via router(s) 140 over an access network(s) (e.g., access network(s) 195a, or the like), to send z-axis data signal 125a containing z-axis data 125. In some examples, 911 or E911 address database system 145 may return a confirmation signal 160a to the VoIP telephone 110 via the router(s) 140 over access network(s) 195a and via IP PBX 135.

In some examples, multi-story location(s) 120 may include, without limitation, at least one of a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, a hospital or other medical facility, a research facility, a university (or other post-secondary) building or buildings within a campus, and/or the like. In cases where emergency situations arise for users in an MDU that has multiple levels, floors, or stories, accurate 911 or E911 including z-axis information is important to correctly and efficiently locate the users both in a horizontal space (e.g., an x-y coordinate representing lateral or horizontal position relative to the ground) and in a vertical position (e.g., distance from a reference point on the Earth, including HAE, ground level, or other point of reference, or the like, that may be used to estimate a particular floor on which the users may be located).

According to some embodiments, system 100 may further include at least one of gateway 165a, portal 165b, API 165c, and/or database(s) 165d, in some cases, disposed or located within access network(s) 195b or the like. In some instances, 911 or E911 address database system 145 may communicatively couple with each of the at least one of gateway 165a, portal 165b, API 165c, and/or database(s) 165d, either directly or indirectly. System 100 may further include a service provider address database(s) 150, an address validation engine 155, and a plurality of nodes or routers 140 or 170, each of which may be disposed in network(s) 195a and/or 195b. The service provider address database(s) 150 may be configured to store user information or information associated with a particular telephone number, including, but not limited to, its copy of each user's or associated telephone number's 911 or E911 address (including z-axis information for a particular address and/or telephone associated with a telephone number), or the like. The address validation engine 155 may be configured to validate an user's or telephone number's 911 or E911 address that is being queried, added, updated, or changed, in some cases, against a standard address format, including, but not limited to, one of an automatic location identification ("ALI") database address format, a master street address guide ("MSAG") address format, a United States Postal Service ("USPS") database address format, a civil service address format, or North American 9-1-1 Resource Database address format, and/or the like. In some examples, the plurality of routers 140 or 170 is configured to route and/or establish session initiation protocol ("SIP")-based communication sessions throughout the network(s) 195a and/or 195b. In some cases, each SIP-based communication may include, without limitation, at least one of a VoIP call, an IP-based video call, or an instant message over IP, and/or the like.

In some embodiments, system 100 may further include an emergency service provider system or server 175 and corresponding emergency service provider database(s) 180, which may both be disposed within an emergency service provider network(s) 195c (which, like network(s) 195b, may be part of network(s) 195a associated with a first service provider, an extension of network(s) 195a, or a different but communicatively coupled network(s) with respect to network(s) 195a (in some cases, associated with a third service provider different from one or both of the first service provider or the second service provider), or the like). In some examples, the 911 or E911 address database system 145 may include at least one of an emergency call record system, an address validation system, or an IVR system for an address database, and/or the like. In some cases, the emergency service provider system or server 175 may include a third-party vendor system or server. According to some embodiments, system 100 may further include one or more public safety access points ("PSAPs") 185a-185z (collectively, "PSAPs 185" or the like) and corresponding E911 database(s) 190, which may both be disposed within a PSAP network(s) 195d (which, like network(s) 195b or 195c, may be part of network(s) 195a associated with a first service provider, an extension of network(s) 195a, or a different but communicatively coupled network(s) with respect to network(s) 195a (in some cases, associated with a fourth service provider different from one or more of the first service provider, the second service provider, and/or the third service provider), or the like). In some embodiments, one or more of the address database(s) 150, the emergency service provider database(s) 180, and/or the E911 database(s) 190 may each include, without limitation, at least one of an ALI database, a MSAG, a USPS database, a civil service address format, or North American 9-1-1 Resource Database, and/or the like. Herein, m, n, and z are non-negative integer numbers that may be either all the same as each other, all different from each other, or some combination of same and different (e.g., one set of two or more having the same values with the others having different values, a plurality of sets of two or more having the same value with the others having different values, etc.).

The emergency service provider, using the emergency service provider server or system 175, may be configured to, in response to a user initiating a 911 emergency call, route the 911 emergency call to a local PSAP 185 among the one or more PSAPs 185 on behalf of the user or the service provider. The emergency service provider, using the emergency service provider server or system 175, may also be configured to validate or verify 911 or E911 addresses of the user or the VoIP telephone 110, in some cases, against a standard address format, including, but not limited to, one of an ALI database address format, a MSAG address format, a USPS database address format, a civil service address format, or North American 9-1-1 Resource Database address format, and/or the like. The emergency service provider, using the emergency service provider server or system 175, may be further configured to update one or more PSAPs 185 and/or the E911 database(s) 190. The emergency service provider database(s) 180 may be configured to store user information, including, but not limited to, its copy of each user's 911 or E911 address (including z-axis information for a particular address and/or telephone associated with a telephone number), or the like. The E911 database(s) 190 may be configured to store user addresses or addresses associated with telephone numbers of corresponding VoIP telephones (or other telephones) that would be relied upon and used by local PSAPs 185 when dispatching first responders or emergency responders (e.g., law enforcement units, firefighting units, and/or paramedic units, or the like) to the location(s) 120.

According to some embodiments, network(s) 195a, access network(s) 195b, emergency service provider network(s) 195c, and/or PSAP network(s) 195d may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 195a, 195b, 195c, and/or 195d may each include an access network of the service provider (e.g., an Internet service provider ("ISP")). In another embodiment, the network(s) 195a, 195b, 195c, and/or 195d may each include a core network of the service provider and/or the Internet.

In examples, geo-location data—which may be provided to portable z-axis device(s) or user device(s) 105a or location beacon(s) 105b from a geo-location source such as geo-location system 130, or the like—may be used to provide location data that may be used to provide or generate a 911 or E911 address as well as z-axis data. In some cases, the geo-location data may include, without limitation, one of global positioning system ("GPS") data, assisted GPS ("A-GPS") data, global navigation satellite system ("GLO-NASS") data, assisted GLONASS ("A-GLONASS") data, Galileo global navigation satellite system ("GNSS") data, BeiDou navigation satellite system ("BDS") data, geographic information system ("GIS") data, geocoded address data, cellular network radiolocation-based data, wireless phase one ("WPH1") location data, or wireless phase two ("WPH2") location data, and/or the like.

Figures 2A, 2B, 2C:
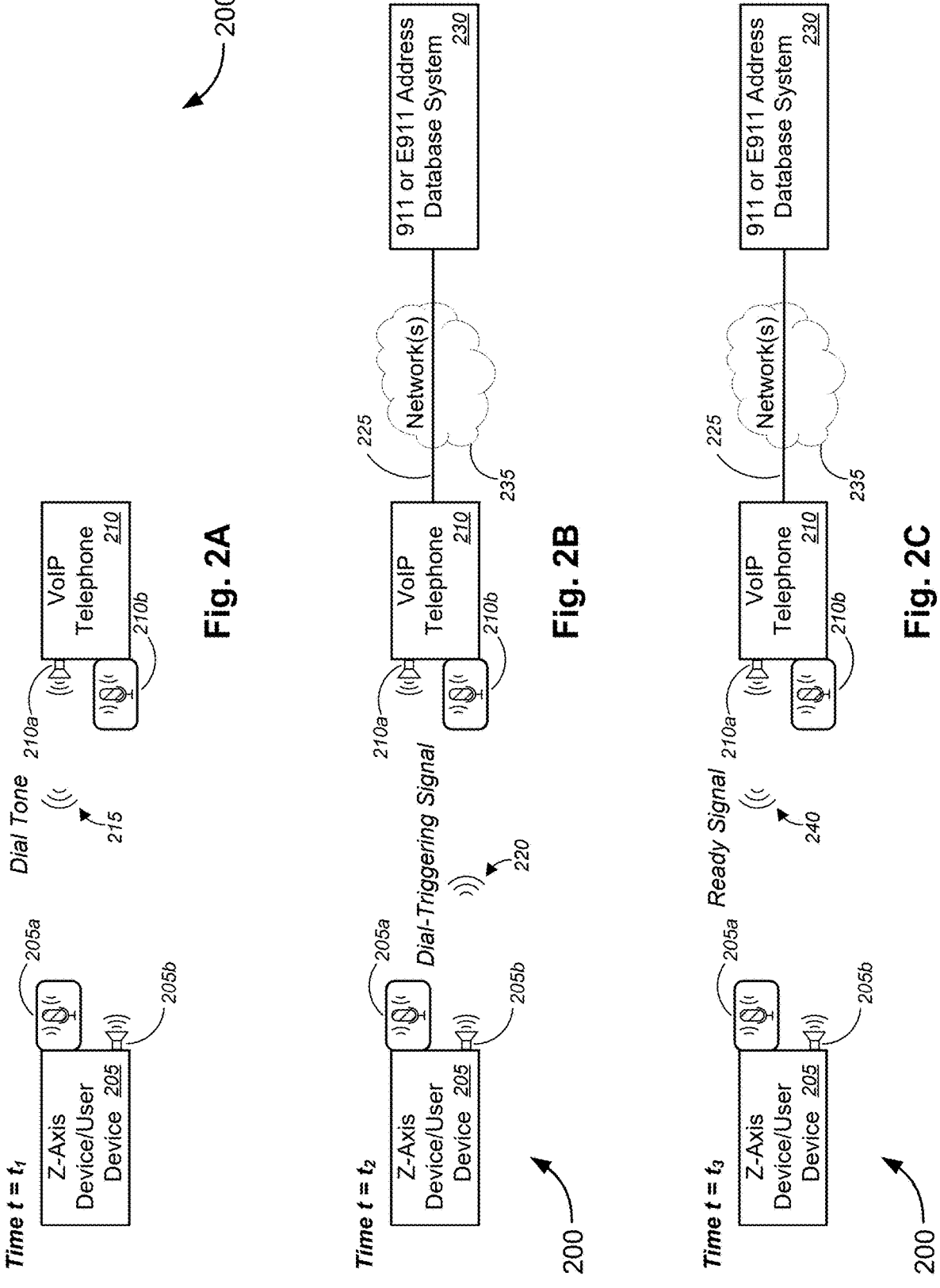
FIGS. 2A-2E depict various example time-sequenced interactions among various components for implementing updating of z-axis information for a VoIP telephone, in accordance with various embodiments.
Figures 2D, 2E:
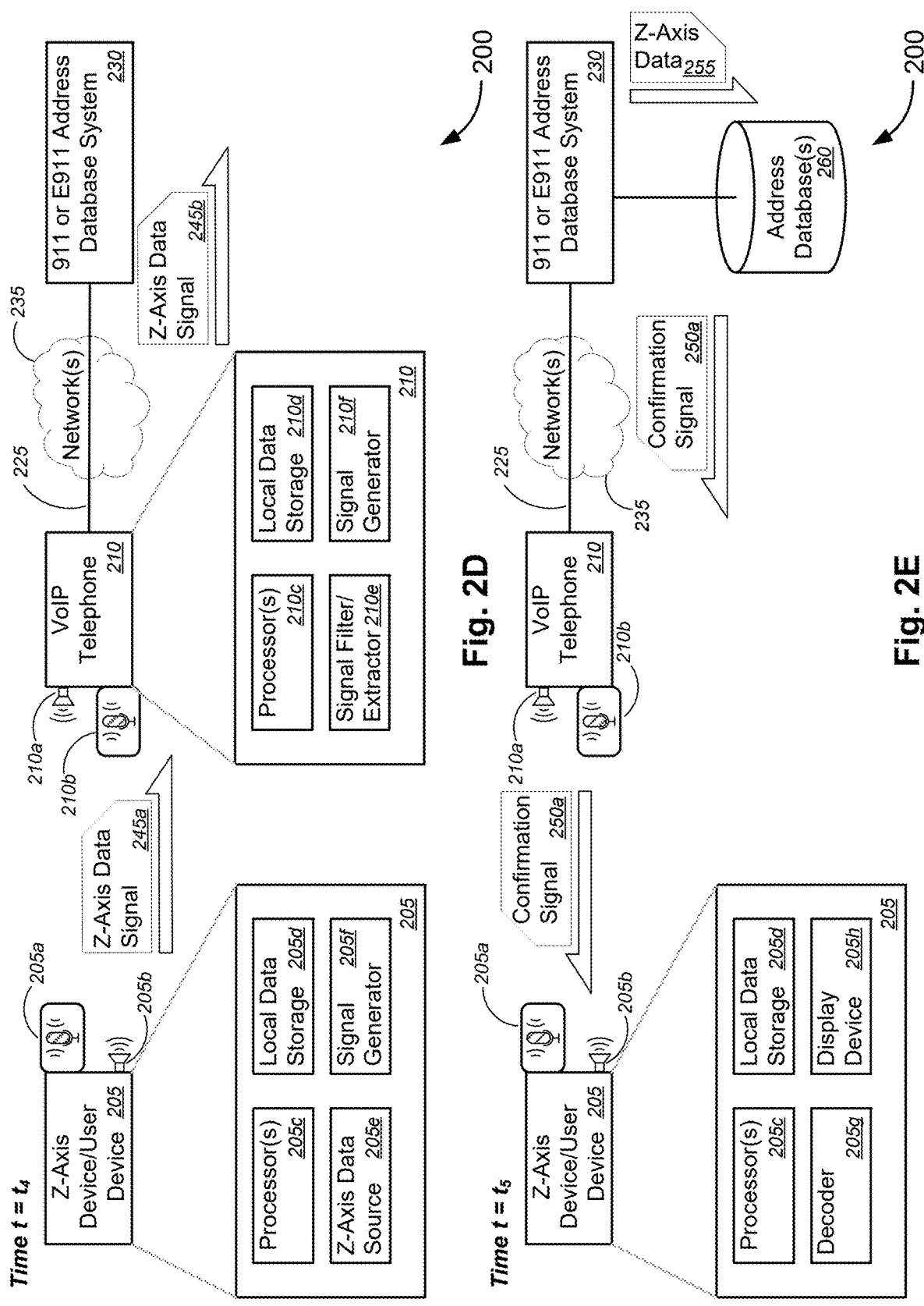
Figure 3A:
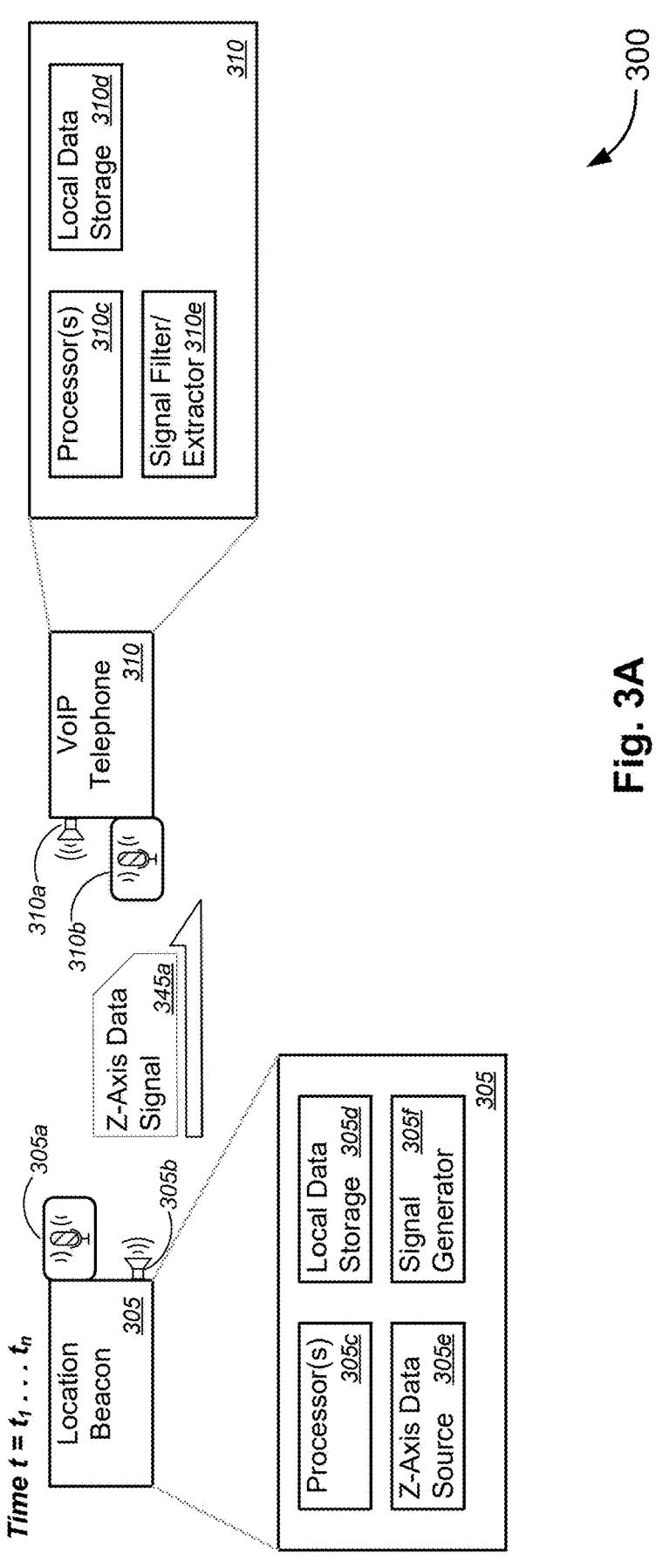
FIGS. 3A-3E depict various example time-sequenced interactions among various components including a VoIP telephone and a location beacon for implementing updating of z-axis information for a VoIP telephone, in accordance with various embodiments.
Figures 3B, 3C:
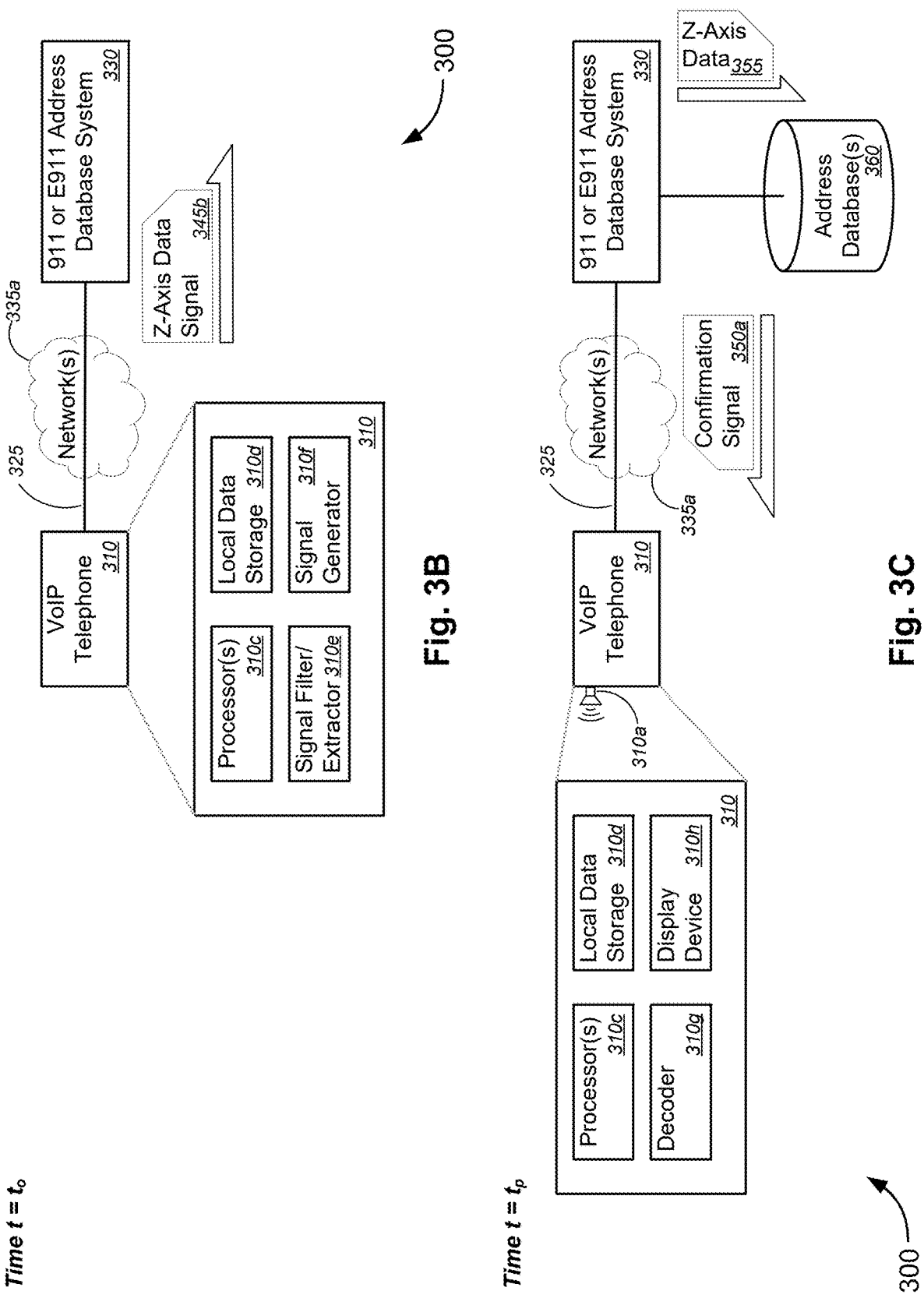
Figures 3D, 3E:
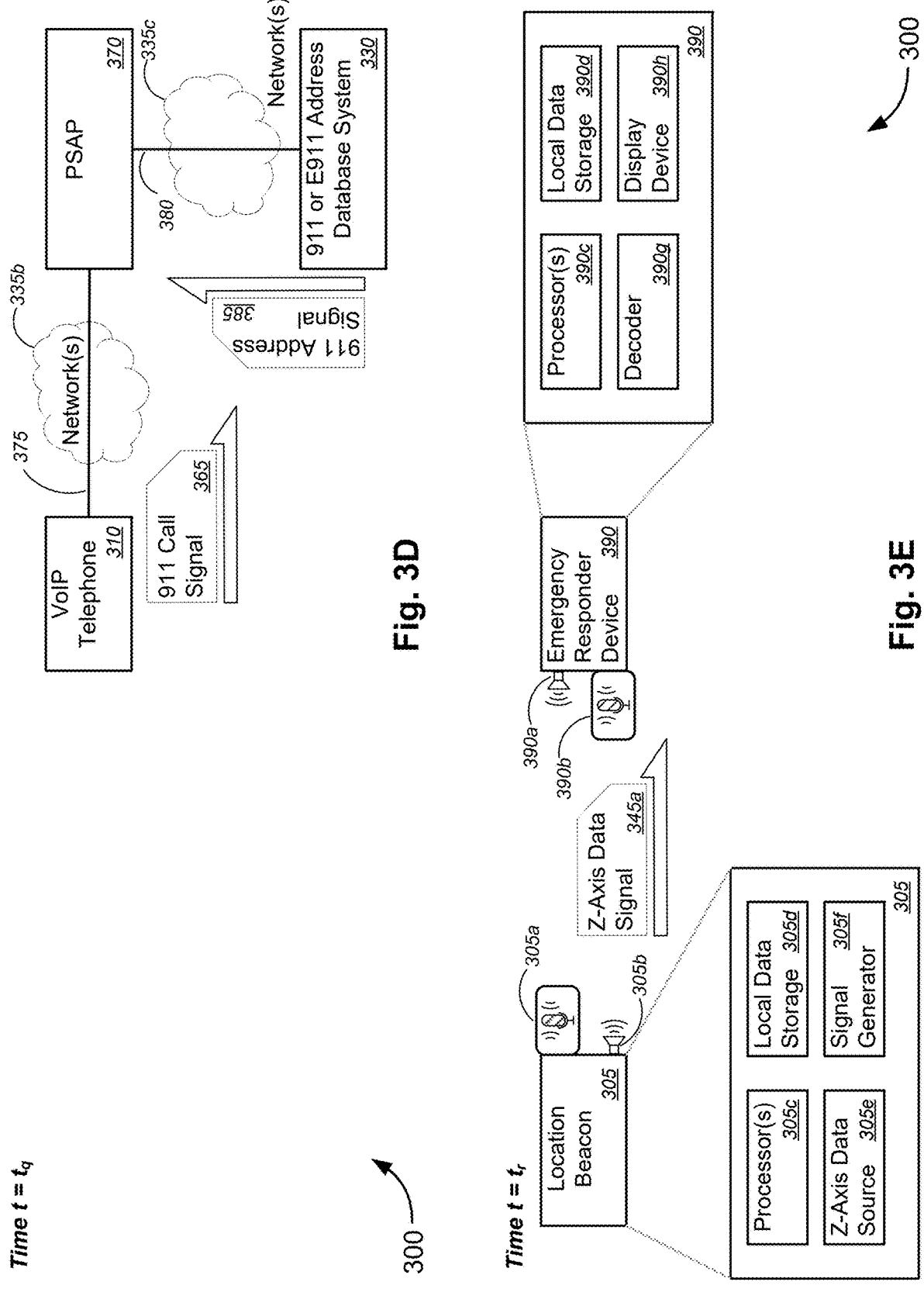
Figure 4A:
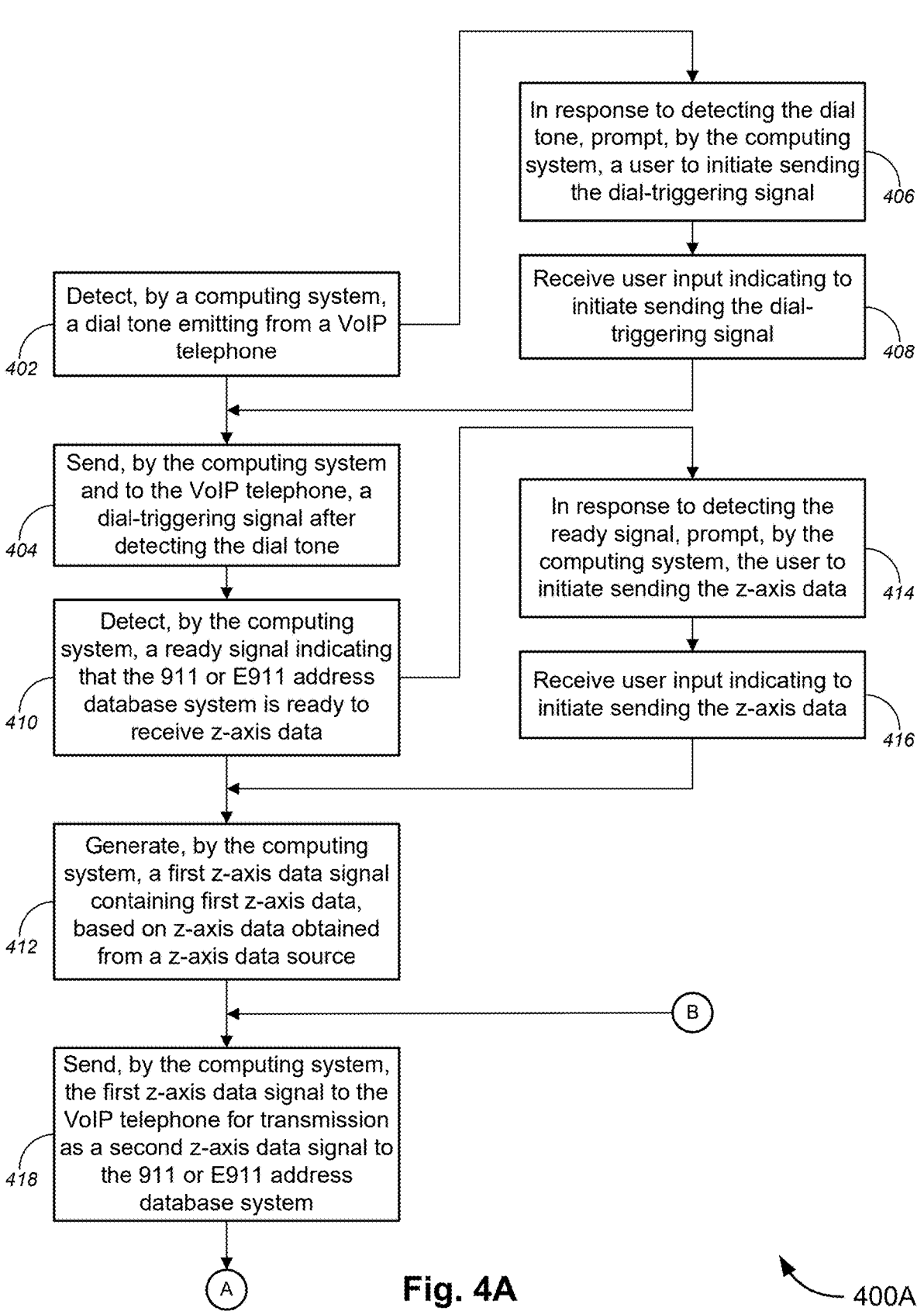
Figure 4C:
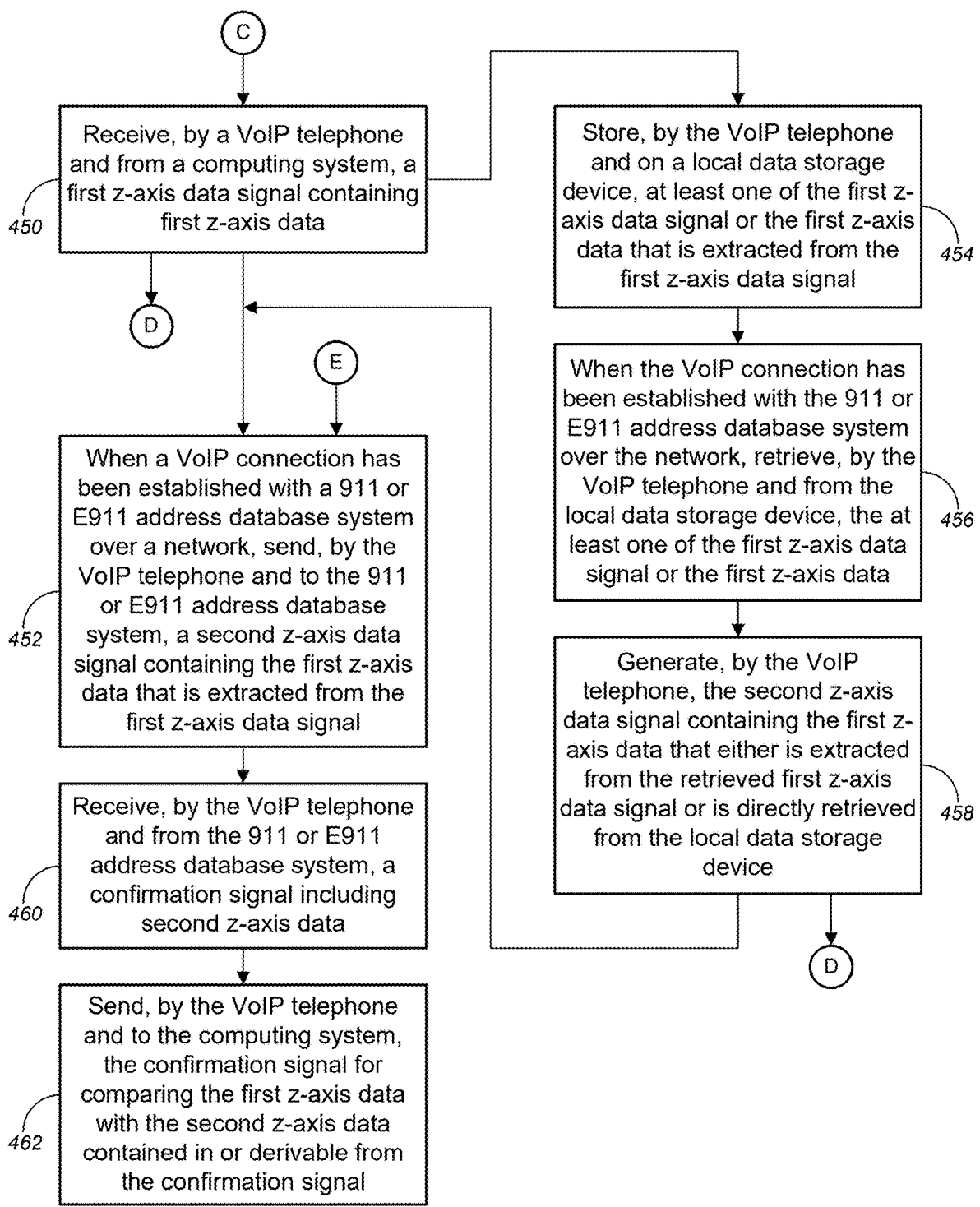

In operation, portable z-axis device(s) or user device(s) 105a and/or location beacon(s) 105b (which is referred to herein as "computing system"), along with VoIP telephone(s) 110a-110m and/or 110' may perform methods for implementing z-axis information for VoIP, as described in detail with respect to FIGS. 2-4. In examples, FIGS. 2A-2E are directed to example time-sequenced interactions 200 among various components for implementing updating of z-axis information for a VoIP telephone, in particular, using portable z-axis devices or user devices (e.g., portable z-axis device(s) or user device(s) 105a or the like), while FIGS. 3A-3E are directed to time-sequenced interactions 300 among various components for implementing updating of z-axis information for a VoIP telephone, in particular, using location beacons (e.g., location beacon(s) 105b or the like). FIGS. 4A and 4B are directed to an example method 400A for implementing z-axis information for VoIP from the perspective of the computing system (e.g., portable z-axis device(s) or user device(s) 105a and/or location beacon(s) 105b, or the like), while FIGS. 4C-4F are directed to an example method 400B for implementing z-axis information for VOIP from the perspective of the VoIP telephone (e.g., VoIP telephone 110, or the like).

FIGS. 2A-2E (collectively, "FIG. 2") depict various example time-sequenced interactions 200 among various components for implementing updating of z-axis information for a VoIP telephone, in accordance with various embodiments.

In some embodiments, z-axis device(s) or user device(s) 205, VoIP telephone 210, 911 or E911 address database system 230, network(s) 235, z-axis data signals 245a and 245b, and confirmation signal(s) 250a of FIG. 2 may be similar, if not identical, to the z-axis device(s) or user device(s) 105a, the one or more VoIP telephones 110a-110m and 110', the 911 or E911 address database system 145, network(s) 195a-195d, z-axis data signals 125 and 125b, and confirmation signal(s) 160 and 160a, respectively, of system 100 of FIG. 1, and the description of these components of system 100 of FIG. 1 are similarly applicable to the corresponding components of FIG. 2. In FIG. 2, z-axis device(s) or user device(s) 205 may include a microphone(s) 205a, a speaker(s) 205b, a processor(s) 205c, a local data storage device(s) 205d, a z-axis data source(s) 205e, a signal generator(s) 205f, a decoder(s) 205g, and a display device(s) 205h, and/or the like. Similarly, in FIG. 2, VoIP telephone 210 may include a speaker(s) 210a, a microphone(s) 210b, a processor(s) 210c, a local data storage device(s) 210d, a signal filter(s)/extractor(s) 210e, and a signal generator(s) 210f, and/or the like. Herein, times $t=t_1 \ldots t_5$ each corresponds to a period during which particular sets of actions or interactions take place, and each period can have any suitable duration (which may be the same or different from other periods) with any suitable intervals between periods (which intervals may be the same or different from other intervals).

With reference to FIG. 2A, at time $t=t_1$, when the VoIP telephone 210 is in an off-hook mode or state (whether with its handset off its cradle or with speaker phone mode turned on), VoIP telephone 210 may send or emit dial tone 215 (via speaker 210a), which may be received or detected by z-axis device(s) or user device(s) 205 (via microphone 205a), the z-axis device(s) or user device(s) 205 being proximate to (or at least within audible detection range of) VoIP telephone 210.

Referring to FIG. 2B, at time $t=t_2$, in response to detecting the dial tone 215 (indicative of the VoIP telephone 210 being in the off-hook mode or state), z-axis device(s) or user device(s) 205 may send or emit a dial-triggering signal 220 (via speaker 205b), which may be received by VoIP telephone 210 (via microphone 210b). In some instances, the dial-triggering signal 220 includes one of a DTMF signal or an FSK signal, or the like. The dial-triggering signal 220 causes the VoIP telephone 210 to dial a telephone number corresponding to 911 or E911 address database system 230 to establish a VoIP connection between the VoIP telephone 210 and the 911 or E911 address database system 230 over network(s) 235.

Turning to FIG. 2C, at time t=t₃, the 911 or E911 address database system 230 may send a ready signal 240 (indicating the 911 or E911 address database system 230 is ready to receive z-axis information) to VoIP telephone 210 via VoIP connection 225 over network(s) 235. The VoIP telephone 210 then relays the ready signal 240 (via speaker 210a) to z-axis device(s) or user device(s) 205, which may receive the ready signal 240 (via microphone 205a).

With reference to FIG. 2D, at time t=t₄, in response to receiving the ready signal 240, processor(s) 205c of z-axis device(s) or user device(s) 205 either may retrieve first or current z-axis data from local data storage device 205d or may retrieve or obtain first or current z-axis data from z-axis data source 205e. In either case, processor(s) 205c may then cause signal generator 205f to generate a first z-axis data signal 245a, based on the first or current z-axis data, and to send first z-axis data signal 245a to VoIP telephone 210 (either via speaker 205b or via a transmitter or transceiver). In response to receiving the first z-axis data signal 245a (either via microphone 310b or via a receiver or transceiver), processor(s) 210c of VoIP telephone 210 may cause signal filter(s)/extractor(s) 210e to filter out or extract the first or current z-axis data from the received first z-axis data signal 245a. In some cases, the processor(s) 210c may store either the first z-axis data signal 245a or the extracted first or current z-axis data in local data storage device 210d. After extracting the first or current z-axis data, processor(s) 210c may then cause signal generator 210f to generate a second z-axis data signal 245b, based on the extracted first or current z-axis data, and to send second z-axis data signal 245b to 911 or E911 address database system 230 via VoIP connection 225 over network(s) 235.

In some embodiments, generating and sending the first z-axis data signal includes modulating an RF signal as a carrier signal to carry the first z-axis data. In some cases, the RF signal is one of a RTTY-based signal, an FSK-based signal, a PSK-based signal, or a DTMF signal, and/or the like. In examples, generating and sending the first z-axis data signal includes sending the RF signal modulated to carry the first z-axis data for the VoIP telephone 210 to extract the first z-axis data and to send the z-axis data as the second z-axis data signal to the 911 or E911 address database system 230. According to some embodiments, the first z-axis data is encoded as a first data signal represented by at least two tones (in some cases, 8 different tones, or more may be used), based on a signal encoding scheme corresponding to the RF signal that is modulated as the carrier signal to carry the first z-axis data. In some instances, extracting the z-axis data at the VoIP telephone 210 includes demodulating the RF signal to extract the first data signal represented by the at least two tones and filtering the first data signal to obtain the first z-axis data.

Referring to FIG. 2E, at time t=t₅, after receiving the second z-axis data signal 245b (and after extracting the current or first z-axis data from the second z-axis data signal 245b), the 911 or E911 address database system 230 may generate a confirmation signal 250a containing second z-axis data (corresponding to the extracted z-axis data from the second z-axis data signal 245b), and may send the confirmation signal 250a to VoIP telephone 210 via VOIP connection 225 over network(s) 235. The VoIP telephone

210 may then send the confirmation signal 250a to z-axis device(s) or user device(s) 205 (either via speaker 210a or via a transmitter or transceiver). The z-axis device(s) or user device(s) 205 may receive the confirmation signal 250a (either via microphone 205a or via a receiver or transceiver). Processor(s) 205c may cause decoder(s) 205g to decode or extract the second z-axis data signal from the confirmation signal 250a, may compare the extracted second z-axis data signal with the first z-axis data signal that was stored in local data storage device 205d, and may display results of the comparison on display device 205h. In examples, the confirmation signal 250a may include one of a text-to-speech generated verbal recitation of the z-axis data that is extracted from the second z-axis data signal 245b, a third z-axis data signal that is generated based on the z-axis data that is extracted from the second z-axis data signal 245b, or a signal containing a check-sum value corresponding to the z-axis data that is extracted from the second z-axis data signal 245b, and/or the like. In some examples, 911 or E911 address database system 230 may send the extracted second z-axis data 255 to address database(s) 260 for updating 911 or E911 address information associated with a telephone number of the VoIP telephone 310. In some cases, if the results of the comparison by processor(s) 205c indicates a match, the results may be sent to the VoIP telephone 210, which may relay the results to the 911 or E911 address database system 230. In such cases, sending the second z-axis data 255 to address database(s) 260 may be performed in response to receiving the results indicating a match.

FIGS. 3A-3E (collectively, "FIG. 3") depict various example time-sequenced interactions 300 among various components including a VoIP telephone and a location beacon for implementing updating of z-axis information for a VoIP telephone, in accordance with various embodiments.

In some embodiments, location beacon(s) 305, VoIP telephone 310, 911 or E911 address database system 330, network(s) 335a and 335b, z-axis data signals 345a and 345b, confirmation signal(s) 350a, and PSAP 370 of FIG. 3 may be similar, if not identical, to the location beacon(s) 105b, the one or more VoIP telephones 110a-110m and 110', the 911 or E911 address database system 145, network(s) 195a-195d, z-axis data signals 125 and 125b, confirmation signal(s) 160 and 160a, and PSAPs 185a-185z, respectively, of system 100 of FIG. 1, and the description of these components of system 100 of FIG. 1 are similarly applicable to the corresponding components of FIG. 3. In FIG. 3, location beacon(s) 305 may include a microphone(s) 305a, a speaker(s) 305b, a processor(s) 305c, a local data storage device(s) 305d, a z-axis data source(s) 305e, a signal generator(s) 305f, and/or the like. Similarly, in FIG. 3, VoIP telephone 310 may include a speaker(s) 310a, a microphone(s) 310b, a processor(s) 310c, a local data storage device(s) 310d, a signal filter(s)/extractor(s) 310e, and a signal generator(s) 310f, a decoder(s) 310g, and a display device(s) 310h, and/or the like. Likewise, emergency responder device 390 may include a speaker(s) 390a, a microphone(s) 390b, a processor(s) 390c, a local data storage device(s) 390d, a decoder(s) 390g, and a display device(s) 390h, and/or the like. Herein, times t=t₁ . . . tr each corresponds to a period during which particular sets of actions or interactions take place, and each period can have any suitable duration (which may be the same or different from other periods) with any suitable intervals between periods (which intervals may be the same or different from other intervals).

Turning to FIG. 3A, at time t=t₁ . . . tₙ, processor(s) 305c of location beacon(s) 305 either may retrieve first or current z-axis data from local data storage device 305d or may retrieve or obtain first or current z-axis data from z-axis data source 305e. In either case, processor(s) 305c may then cause signal generator 305f to generate a first z-axis data signal 345a, based on the first or current z-axis data, and to send first z-axis data signal 345a to VoIP telephone 310 (either via speaker 305b or via a transmitter or transceiver). The location beacon(s) 305 may transmit the first z-axis data signal 345a periodically, on a scheduled basis, or on-demand over periods $t_1 \ldots t_n$. In response to receiving the first z-axis data signal 345a (either via microphone 310b or via a receiver or transceiver), processor(s) 310c of VoIP telephone 310 may cause signal filter(s)/extractor(s) 310e to filter out or extract the first or current z-axis data from the received first z-axis data signal 345a. In some cases, the processor(s) 310c may store either the first z-axis data signal 345a or the extracted first or current z-axis data in local data storage device 310d.

With reference to FIG. 3B, at time $t=t_o$, processor(s) 310c of VoIP telephone 310 may retrieve, from local data storage device 310d, either the stored extracted first or current z-axis data from the received first z-axis data signal 345a or the stored first z-axis data signal 245. If the latter, processor(s) 310c may cause signal filter(s)/extractor(s) 310e to filter out or extract the first or current z-axis data from the retrieved first z-axis data signal 345a. After the first or current z-axis data has been retrieved or extracted, processor(s) 310c may then cause signal generator 310f to generate a second z-axis data signal 345b, based on the retrieved or extracted first or current z-axis data, and to send second z-axis data signal 345b to 911 or E911 address database system 330 via VOIP connection 325 over network(s) 335. As with the example of FIG. 2D above, for examples of FIGS. 3A and 3B, generating and sending the first z-axis data signal includes modulating an RF signal as a carrier signal to carry the first z-axis data, and in some cases, the first z-axis data may be encoded as a first data signal represented by at least two tones (in some cases, 8 different tones, or more may be used), based on a signal encoding scheme corresponding to the RF signal that is modulated as the carrier signal to carry the first z-axis data, and extracting the z-axis data at the VoIP telephone 310 includes demodulating the RF signal to extract the first data signal represented by the at least two tones and filtering the first data signal to obtain the first z-axis data.

Referring to FIG. 3C, at time $t=t_p$, after receiving the second z-axis data signal 345b (and after extracting the current or first z-axis data from the second z-axis data signal 345b), the 911 or E911 address database system 330 may generate a confirmation signal 350a containing second z-axis data (corresponding to the extracted z-axis data from the second z-axis data signal 345b), and may send the confirmation signal 350a to VoIP telephone 310 via VOIP connection 325 over network(s) 335. Processor(s) 310c of VoIP telephone 310 may cause decoder(s) 310g to decode or extract the second z-axis data signal from the confirmation signal 350a, may compare the extracted second z-axis data signal with the first z-axis data signal that was stored in local data storage device 310d, and may display results of the comparison on display device 310h. In examples, the confirmation signal 350a may include one of a text-to-speech generated verbal recitation of the z-axis data that is extracted from the second z-axis data signal 345b, a third z-axis data signal that is generated based on the z-axis data that is extracted from the second z-axis data signal 345b, or a signal containing a check-sum value corresponding to the z-axis data that is extracted from the second z-axis data signal 345b, and/or the like. In some examples, 911 or E911 address database system 330 may send the extracted second z-axis data 355 to address database(s) 360 for updating 911 or E911 address information associated with a telephone number of the VoIP telephone 310. In some cases, if the results of the comparison by processor(s) 310c indicates a match, the results may be sent by the VoIP telephone 310 to the 911 or E911 address database system 330. In such cases, sending the second z-axis data 355 to address database(s) 360 may be performed in response to receiving the results indicating a match.

Turning to FIG. 3D, at time $t=t_q$, in response to a user making a 9-1-1 call on the VOIP telephone 310, the VoIP telephone 310 may send a 911 call signal 365 to PSAP 370 via VOIP connection 375 over network(s) 335b. The PSAP 370 may access 911 or E911 address database system 330 via connection 380 over network(s) 335c to request the 911 or E911 address (including z-axis information) associated with the VoIP telephone 310. If found, the 911 or E911 address database system 330 may send 911 address signal 385 containing the requested 911 or E911 address (including z-axis information (if available)) to the PSAP 370.

With reference to FIG. 3E, at time $t=t_r$, after the PSAP 370 provides emergency responders with 911 or E911 address information (including z-axis information) associated with the VoIP telephone 310, in some cases, by sending to emergency responder device(s) 390 associated with the emergency responders, processor(s) 390c may store the 911 or E911 address information (including z-axis information) associated with the VoIP telephone 310 in local data storage device 390d and may cause decoder 390g to extract location information (including z-axis information) of the VoIP telephone for display on display device 390h. In examples, location beacons 305 throughout the multi-story building or location may broadcast or send z-axis data signals 345a (generated by signal generator 305f based on current z-axis data for each particular location beacon 305 obtained from its z-axis data source 305e or its local data storage device 305d), and when the emergency responder device 390 is within range of each location beacon 305, the emergency responder device 390 may receive the broadcasted or sent z-axis data signals 345a, which may be decoded by decoder 390g and compared (by processor 390c) with the z-axis information associated with VoIP telephone 310 that is accessed from local data storage device 390d. Results of the z-axis information comparison (and/or x-y location information) may be displayed on display device 390h to provide the emergency responder with the most accurate and up-to-date tracking and comparison of location information (including z-axis information).

With reference to FIGS. 1-3, although the various embodiments are directed to z-axis information being sent by z-axis device(s) or user device(s) 105a and/or 205 or location beacon 105b and/or 305, the various embodiments may also include sending x-y location information within the multi-story building or location (or based on a global reference point, such as GPS coordinates or the like).

FIGS. 4A-4F (collectively, "FIG. 4") depict flow diagrams illustrating various example methods 400A and 400B for implementing z-axis information for VoIP, in accordance with various embodiments. In particular, example method 400A of FIGS. 4A and 4B is directed to implementation of z-axis information for VoIP from the perspective of a computing system including one of a z-axis data updating app running on a user device, a z-axis data updating location beacon, or a portable z-axis data updating device, and/or the like. Method 400A of FIG. 4A continues onto FIG. 4B following the circular marker denoted, "A," and returns to FIG. 4A following the circular marker denoted, "B."

Example method 400B of FIGS. 4C-4F, on the other hand, is directed to implementation of z-axis information for VoIP from the perspective of a VoIP telephone. Method 400B of FIG. 4C continues onto FIG. 4E following the circular marker denoted, "D," and returns to FIG. 4C following the circular marker denoted, "E." Method 400B of FIG. 4D continues onto FIG. 4C following the circular marker denoted, "C."

While the techniques and procedures in methods 400A, 400B are depicted and/or described in a certain order for purposes of illustration, it should be appreciated that certain procedures may be reordered and/or omitted within the scope of various embodiments. Moreover, while the methods 400A, 400B may be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the methods 400A, 400B (e.g., by executing instructions embodied on a computer readable medium), the systems, examples, or embodiments 100, 200, and 300 of FIGS. 1, 2, and 3 can each also operate according to other modes of operation and/or perform other suitable procedures.

In the non-limiting embodiment of FIG. 4A, method 400A, at operation 402, may include detecting, by the computing system, a dial tone emitting from the VoIP telephone. At operation 404, method 400A may include sending, by the computing system and to the VOIP telephone, a dial-triggering signal in response to detecting the dial tone. In some embodiments, method 400A may further include, in response to detecting the dial tone, prompting, by the computing system, a user to initiate sending the dial-triggering signal (at operation 406); and receiving user input (e.g., from the user device or the portable z-axis data updating device, or the like) indicating to initiate sending the dial-triggering signal (at operation 408). In such cases, sending the dial-triggering signal (at operation 404) may be performed in response to receiving user input indicating to initiate sending the dial-triggering signal (at operation 408). In some examples, the user input includes one of a tactile input selecting an option to send the dial-triggering signal, a voice input indicating to initiate sending the dial-triggering signal, or a gesture input indicating to initiate sending the dial-triggering signal, and/or the like. In some cases, the tactile input may include pressing, clicking, or otherwise selecting the option to send the dial-triggering signal.

In some instances, the user device includes one of a smart phone, a tablet computer, or a laptop computer, and/or the like. In some cases, the VoIP telephone includes one of a wired VoIP telephone, a table-top VoIP telephone, a counter-top VoIP telephone, a wall-mounted VoIP telephone, a VoIP conferencing telephone, or a cordless VoIP telephone, and/or the like. In some examples, the dial-triggering signal includes one of a DTMF signal or an FSK signal. In examples, the 911 or E911 address database system includes at least one of an emergency call record system, an address validation system, or an IVR system for an address database, and/or the like. In examples, the z-axis data source includes one of a geo-location system, an altimeter, a barometer, or an inertial measurement unit ("IMU")-based inertial navigation system, and/or the like. In some cases, the z-axis data includes at least one of height above ellipsoid ("HAE") data, altitude data, atmospheric pressure data, or altitude data based on tracked motion, acceleration, and orientation, and/or the like.

At operation 410, method 400A may include detecting, by the computing system, a ready signal indicating that the 911 or E911 address database system is ready to receive z-axis data. Method 400A may further include, at operation 412, generating, by the computing system, a first z-axis data signal containing first z-axis data corresponding to a location of the computing system that is proximate to a current location of the VoIP telephone, based on z-axis data obtained from a z-axis data source associated with the computing system. In examples, the z-axis data source includes one of a geo-location system, an altimeter, a barometer, or an inertial measurement unit ("IMU")-based inertial navigation system, and/or the like. In some cases, the z-axis data includes at least one of height above ellipsoid ("HAE") data, altitude data, atmospheric pressure data, or altitude data based on tracked motion, acceleration, and orientation, and/or the like. According to some embodiments, method 400A may further include, in response to detecting the ready signal, prompting, by the computing system, a user to initiate sending the z-axis data (at operation 414); and receiving user input indicating to initiate sending the z-axis data (at operation 416). In such cases generating the z-axis data signal (at operation 412) may be performed in response to receiving user input indicating to initiate sending the z-axis data (at operation 416). At operation 418, method 400A may further include sending, by the computing system, the first z-axis data signal to the VoIP telephone for transmission as a second z-axis data signal to the 911 or E911 address database system for decoding the second z-axis data signal to obtain the first z-axis data and for updating a first 911 or E911 address with the first z-axis data, the first 911 or E911 address being associated with a telephone number of the VoIP telephone. Method 400A may continue onto the process at optional operation 420 in FIG. 4B following the circular marker denoted, "A," before returning to the process at operation 418 in FIG. 4A following the circular marker denoted, "B."

At operation 420 in FIG. 4B (following the circular marker denoted, "A"), method 400A may include receiving, by the computing system and from the 911 or E911 address database system via the VoIP telephone, a confirmation signal including second z-axis data. In examples, the confirmation signal includes one of a text-to-speech generated verbal recitation of the first z-axis data, a third z-axis data signal that is generated based on the first z-axis data that is received via the second z-axis data signal by the 911 or E911 address database system, or a signal containing a check-sum value corresponding to the first z-axis data that is received via the second z-axis data signal by the 911 or E911 address database system, and/or the like. Method 400A further includes, at operation 422, comparing, by the computing system, the first z-axis data with the second z-axis data contained in or derivable from the confirmation signal to determine whether the second z-axis data matches the first z-axis data. If so, method 400A continues onto the process at operation 424, at which method 400A further includes, based on determination that the z-axis data contained in or derivable from the confirmation signal matches the first z-axis data, presenting, by the computing system, a message indicating successful transmission of the first z-axis data. If not, method 400A returns to the process at operation 418 in FIG. 4A following the circular marker denoted, "B," the processes of sending the second z-axis data signal (at operation 418), receiving the confirmation signal (at operation 420), and comparing the z-axis data contained in or derivable from the confirmation signal (at operation 422) are repeated.

With reference to FIGS. 4C-4F, method 400B may include, at operation 450, receiving, by a VoIP telephone and from a computing system, a first z-axis data signal containing first z-axis data corresponding to a location of the computing system that is proximate to a current location of the VoIP telephone, based on z-axis data obtained from a z-axis data source associated with the computing system. Method 400B may continue onto the process at operation 452, the process at operation 454, or the process at operation 474 following the circular marker denoted, "D," before returning to the process at operation 452 following the circular marker denoted "E." At operation 452, method 400B may further include, when a VoIP connection has been established with a 911 or E911 address database system over a network, sending, by the VoIP telephone and to the 911 or E911 address database system, a second z-axis data signal containing the first z-axis data that is extracted from the first z-axis data signal.

According to some embodiments, at operation 454, method 400B may further include storing, by the VoIP telephone and on a local data storage device, at least one of the first z-axis data signal or the first z-axis data that is extracted from the first z-axis data signal. In some examples, method 400B may further include, when the VOIP connection has been established with the 911 or E911 address database system over the network, retrieving, by the VoIP telephone and from the local data storage device, the at least one of the first z-axis data signal or the first z-axis data (at operation 456); and generating, by the VoIP telephone, the second z-axis data signal containing the first z-axis data that either is extracted from the retrieved first z-axis data signal or is directly retrieved from the local data storage device (at operation 458). In an example, method 400B may continue onto the process at operation 452. In such cases, the second z-axis data signal that is sent at operation 452 may be the second z-axis data signal that is generated at operation 456. Alternatively, in another example, method 400B may continue onto the process at operation 474 in FIG. 4E following the circular marker denoted, "D," before returning to the process at operation 452 following the circular marker denoted, "E."

In examples, the first z-axis data signal that is received from the computing system is an RF signal that has been modulated as a carrier signal to carry the first z-axis data, where the RF signal is one of a RTTY-based signal, an FSK-based signal, a PSK-based signal, or a DTMF signal, and/or the like. At operation 474 in FIG. 4E (following the circular marker denoted, "D"), method 400B may include demodulating or filtering, by the VoIP telephone, the RF signal that is received as the first z-axis data signal to extract the first z-axis data. Method 400B may further include generating, by the VoIP telephone, an audible signal as the second z-axis data signal containing the extracted first z-axis data (at operation 476). In such cases, method 400B may return to the process at operation 452 in FIG. 4C following the circular marker denoted, "E," at which sending the second z-axis data signal includes sending the generated audible signal (from operation 476).

Turning back to FIG. 4C, method 400B may further include receiving, by the VoIP telephone and from the 911 or E911 address database system, a confirmation signal including second z-axis data (at operation 460); and sending, by the VoIP telephone and to the computing system, the confirmation signal for comparing the first z-axis data with the second z-axis data contained in or derivable from the confirmation signal (at operation 462).

According to some embodiments, referring to FIG. 4D, method 400B may further include, when in an off-hook state, emitting, by the VoIP telephone, a dial tone (at operation 464); and receiving, by the VoIP telephone and from the computing system, a dial-triggering signal that is sent by the computing system after detecting the dial tone (at operation 466). In some instances, the dial-triggering signal includes one of a DTMF signal or an FSK signal. In some cases, the dial-triggering signal may be sent autonomously or in response to user input from a user following a user prompt that is presented to the user on the computing system after the computing system detects the dial tone (such as described above with respect to FIG. 4A, or the like). At operation 468, method 400B may further include establishing, by the VoIP telephone, a VoIP connection with the 911 or E911 address database system over a network. Method 400B may further include receiving, by the VoIP telephone, a ready signal indicating that the 911 or E911 address database system is ready to receive z-axis data (at operation 470). Method 400B, at operation 472, may include relaying, by the VoIP telephone, the ready signal to the computing system. Method 400B may continue onto the process at operation 450 in FIG. 4C following the circular marker denoted, "C."

Referring to FIG. 4F, in an example, receiving the first z-axis data signal (at operation 450) may include receiving the first z-axis data signal from an app running on a user device or from a portable z-axis data updating device, in response to the app detecting a ready signal, via the VOIP connection, indicating that the 911 or E911 address database system is ready to receive z-axis data (at operation 478). Alternatively, in another example, receiving the first z-axis data signal (at operation 450) may include receiving the first z-axis data signal from the app running on the user device or from the portable z-axis data updating device, in response to user input from a user following a user prompt that is presented to the user on the computing system after the app detects the ready signal, via the VoIP connection (at operation 480). Alternatively, in yet another example, receiving the first z-axis data signal (at operation 450) may include receiving the first z-axis data signal from a z-axis data updating location beacon during one of a plurality of data transmission bursts that are transmitted periodically, on a scheduled basis, or on-demand (at operation 482). In some cases, the first z-axis data signal that is received from the z-axis data updating location beacon is transmitted at a frequency above human audible range. In examples, the user device or the z-axis data updating location beacon is proximate to, and within audible signal pickup range of, the VoIP telephone.

Exemplary System and Hardware Implementation

Figure 5:
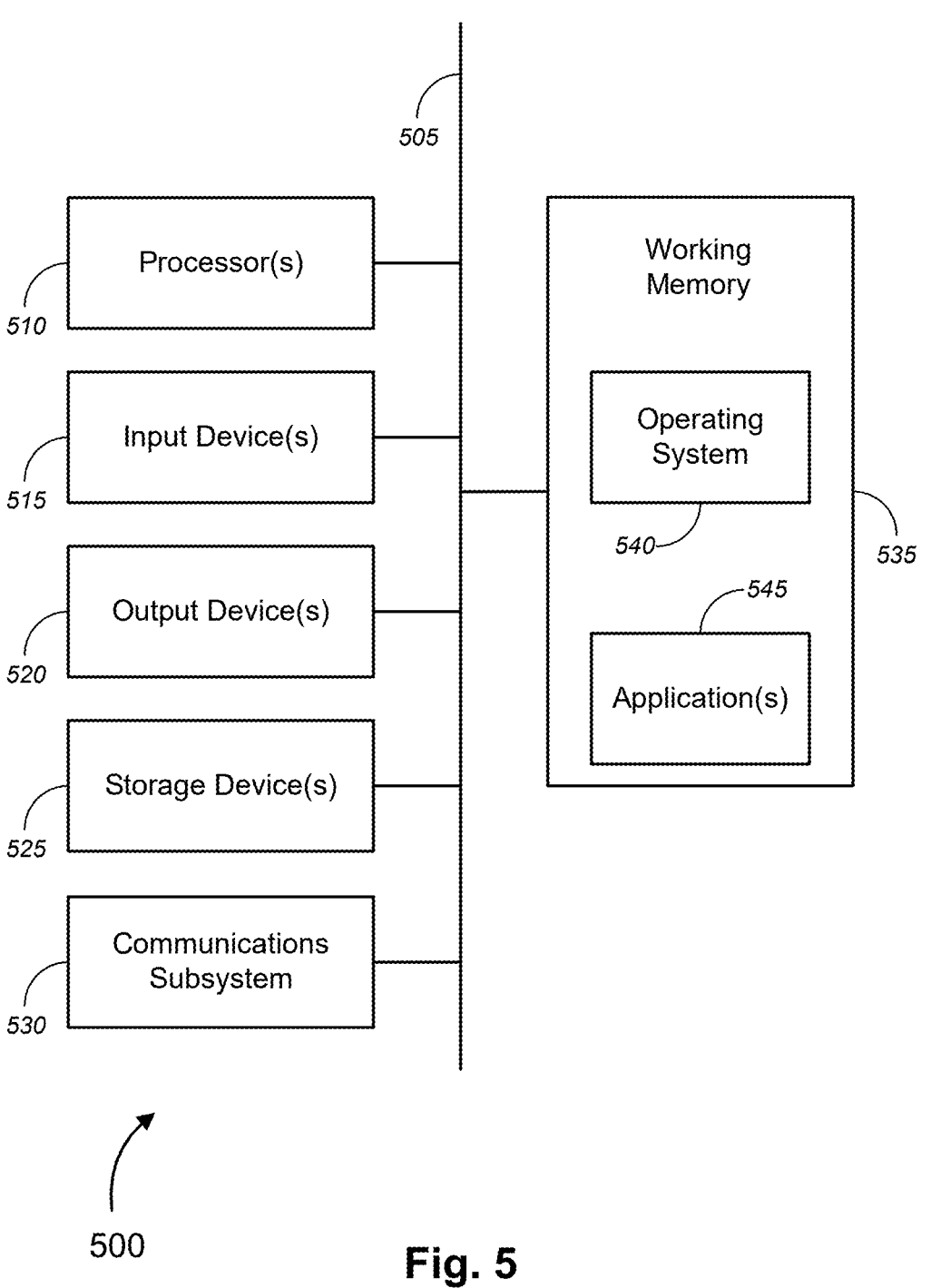
FIG. 5 depicts a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., portable z-axis devices or user devices 105a and 205, location beacons 105b and 305, VOIP telephones 110a-110m, 110', 210, and 310, geo-location system 130, routers 140 and 170, 911 or E911 address database systems 145, 230, and 330, address validation engine 155, gateway 165a, emergency service provider system 175, PSAPs 185a-185z and 370, and emergency responder device 390, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., portable z-axis devices or user devices 105a and 205, location beacons 105b and 305, VoIP telephones 110a-110m, 110', 210, and 310, geo-location system 130, routers 140 and 170, 911 or E911 address database systems 145, 230, and 330, address validation engine 155, gateway 165a, emergency service provider system 175, PSAPs 185a-185z and 370, and emergency responder device 390, etc.), described above with respect to FIGS. 1-4—is shown including hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can include, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a Wi-Fi device, a WiMAX device, a wireless wide area network ("WWAN") device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further include a working memory 535, which can include a RAM or ROM device, as described above.

The computer or hardware system 500 also may include software elements, shown as being currently located within the working memory 535, including an operating system 540, device drivers, executable libraries, and/or other code, such as one or more application programs 545, which may include computer programs provided by various embodiments (including, without limitation, hypervisors, virtual machines ("VMs"), and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that include the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   sending, by a computing system and to a voice over Internet protocol ("VoIP") telephone, a dial-triggering signal to cause the VoIP telephone to dial a telephone number corresponding to a 911 or E911 address database system;
   generating, by the computing system, a first z-axis data signal containing first z-axis data corresponding to a location of the computing system that is proximate to a current location of the VoIP telephone, based on z-axis data obtained from a z-axis data source associated with the computing system; and
   sending, by the computing system, the first z-axis data signal to the VoIP telephone for transmission as a second z-axis data signal to the 911 or E911 address database system for decoding the second z-axis data signal to obtain the first z-axis data and for updating a first 911 or E911 address with the first z-axis data, the first 911 or E911 address being associated with a telephone number of the VoIP telephone.

2. The method of claim 1, wherein the computing system includes one of a z-axis data updating software application ("app") running on a user device, a z-axis data updating location beacon, or a portable z-axis data updating device, wherein the user device includes one of a smart phone, a tablet computer, or a laptop computer, wherein the VoIP telephone includes one of a wired VoIP telephone, a table-top VoIP telephone, a counter-top VoIP telephone, a wall-mounted VoIP telephone, a VoIP conferencing telephone, or a cordless VoIP telephone.

3. The method of claim 1, wherein the dial-triggering signal includes one of a dual-tone multi-frequency ("DTMF") signal or a frequency shift keying ("FSK") signal.

4. The method of claim 1, wherein the 911 or E911 address database system includes at least one of an emergency call record system, an address validation system, or an interactive voice response ("IVR") system for an address database.

5. The method of claim 1, further comprising:
   detecting, by the computing system, a dial tone emitting from the VoIP telephone.

6. The method of claim 5, wherein sending the dial-triggering signal comprises one of:
   sending, by the computing system and to the VoIP telephone, the dial-triggering signal in response to detecting the dial tone; or in response to detecting the dial tone, prompting, by the computing system, a user to initiate sending the dial-triggering signal, wherein sending the dial-triggering signal is performed in response to receiving user input indicating to initiate sending the dial-triggering signal, wherein the user input includes one of a tactile input selecting an option to send the dial-triggering signal, a voice input indicating to initiate sending the dial-triggering signal, or a gesture input indicating to initiate sending the dial-triggering signal.

7. The method of claim 1, further comprising:

detecting, by the computing system, a ready signal indicating that the 911 or E911 address database system is ready to receive z-axis data;

wherein generating and sending the first z-axis data signal are performed in response to detecting the ready signal.

8. The method of claim 1, wherein generating and sending the first z-axis data signal comprises:

modulating, by the computing system, a radio frequency ("RF") signal as a carrier signal to carry the first z-axis data, wherein the RF signal is one of a radio teletype ("RTTY")-based signal, an FSK-based signal, a phase shift keying ("PSK")-based signal, or a DTMF signal; and sending, by the computing system, the RF signal modulated to carry the first z-axis data for the VoIP telephone to extract the first z-axis data and to send the z-axis data as the second z-axis data signal to the 911 or E911 address database system.

9. The method of claim 8, wherein the first z-axis data is encoded as a first data signal represented by at least two tones, based on a signal encoding scheme corresponding to the RF signal that is modulated as the carrier signal to carry the first z-axis data, wherein extracting the z-axis data at the VoIP telephone comprises demodulating the RF signal to extract the first data signal represented by the at least two tones and filtering the first data signal to obtain the first z-axis data.

10. The method of claim 1, wherein the z-axis data source includes one of a geo-location system, an altimeter, a barometer, or an inertial measurement unit ("IMU")-based inertial navigation system, wherein the z-axis data includes at least one of height above ellipsoid ("HAE") data, altitude data, atmospheric pressure data, or altitude data based on tracked motion, acceleration, and orientation.

11. The method of claim 1, further comprising:

receiving, by the computing system and from the 911 or E911 address database system via the VoIP telephone, a confirmation signal including one of a text-to-speech generated verbal recitation of the first z-axis data, a third z-axis data signal that is generated based on the first z-axis data that is received via the second z-axis data signal by the 911 or E911 address database system, or a signal containing a check-sum value corresponding to the first z-axis data that is received via the second z-axis data signal by the 911 or E911 address database system;

comparing, by the computing system, the first z-axis data with z-axis data contained in or derivable from the confirmation signal; and performing one of:

based on determination that the z-axis data contained in or derivable from the confirmation signal matches the first z-axis data, presenting, by the computing system, a message indicating successful transmission of the first z-axis data; or based on determination that the z-axis data contained in or derivable from the confirmation signal does not match the first z-axis data, repeating the processes of sending the second z-axis data signal, receiving the confirmation signal, and comparing the z-axis data contained in or derivable from the confirmation signal.

12. A method, comprising:

receiving, by a voice over Internet protocol ("VoIP") telephone and from a computing system, a first z-axis data signal containing first z-axis data corresponding to a location of the computing system that is proximate to a current location of the VoIP telephone, based on z-axis data obtained from a z-axis data source associated with the computing system;

when a VoIP connection has been established with a 911 or E911 address database system over a network, sending, by the VoIP telephone and to the 911 or E911 address database system, a second z-axis data signal containing the first z-axis data that is extracted from the first z-axis data signal;

receiving, by the VoIP telephone and from the 911 or E911 address database system, a confirmation signal including second z-axis data; and sending, by the VoIP telephone and to the computing system, the confirmation signal for comparing the first z-axis data with the second z-axis data contained in or derivable from the confirmation signal.

13. The method of claim 12, wherein the computing system includes one of a z-axis data updating software application ("app") running on a user device, a z-axis data updating location beacon, or a portable z-axis data updating device, wherein the user device includes one of a smart phone, a tablet computer, or a laptop computer, wherein the VoIP telephone includes one of a wired VoIP telephone, a table-top VoIP telephone, a counter-top VoIP telephone, a wall-mounted VoIP telephone, a VoIP conferencing telephone, or a cordless VoIP telephone.

14. The method of claim 12, further comprising:

storing, by the VoIP telephone and on a local data storage device, at least one of the first z-axis data signal or the first z-axis data that is extracted from the first z-axis data signal;

wherein sending the second z-axis data signal to the 911 or E911 address database system comprises:

when the VoIP connection has been established with the 911 or E911 address database system over the network, retrieving, by the VoIP telephone and from the local data storage device, the at least one of the first z-axis data signal or the first z-axis data, generating, by the VoIP telephone, the second z-axis data signal containing the first z-axis data that either is extracted from the retrieved first z-axis data signal or is directly retrieved from the local data storage device, and sending, by the VoIP telephone and to the 911 or E911 address database system over the VoIP connection, the second z-axis data signal.

15. The method of claim 12, wherein receiving the first z-axis data signal comprises one of:

receiving the first z-axis data signal from an app running on a user device or from a portable z-axis data updating device, in response to the app detecting a ready signal, via the VoIP connection, indicating that the 911 or E911 address database system is ready to receive z-axis data;

receiving the first z-axis data signal from the app running on the user device or from the portable z-axis data updating device, in response to user input from a user following a user prompt that is presented to the user on the computing system after the app detects the ready signal, via the VoIP connection; or receiving the first z-axis data signal from a z-axis data updating location beacon during one of a plurality of data transmission bursts that are transmitted periodically, on a scheduled basis, or on-demand, wherein the first z-axis data signal that is received from the z-axis data updating location beacon is transmitted at a frequency above human audible range;

wherein the user device or the z-axis data updating location beacon is proximate to, and within audible signal pickup range of, the VoIP telephone.

16. The method of claim 12, wherein the first z-axis data signal that is received from the computing system is a radio frequency ("RF") signal that has been modulated as a carrier signal to carry the first z-axis data, wherein the RF signal is one of a radio teletype ("RTTY")-based signal, a frequency shift keying ("FSK")-based signal, a phase shift keying ("PSK")-based signal, or a dual-tone multi-frequency ("DTMF") signal, wherein the method further comprises:

demodulating or filtering, by the VoIP telephone, the RF signal that is received as the first z-axis data signal to extract the first z-axis data; and generating, by the VoIP telephone, an audible signal as the second z-axis data signal containing the extracted first z-axis data;

wherein sending the second z-axis data signal comprises sending the generated audible signal.

17. The method of claim 12, further comprising:

when in an off-hook state, emitting, by the VoIP telephone, a dial tone; and receiving, by the VoIP telephone and from the computing system, a dial-triggering signal that is sent by the computing system after detecting the dial tone, wherein the dial-triggering signal includes one of a DTMF signal or an FSK signal, wherein the dial-triggering signal is sent autonomously or in response to user input from a user following a user prompt that is presented to the user on the computing system after the computing system detects the dial tone.

18. A z-axis data updating system, comprising:

a z-axis data source that is configured to obtain current z-axis data;

a data storage system that is configured to store z-axis data;

a signal generator that is configured to generate signals containing or encoded with z-axis data;

a transceiver; and a computing system that is configured to:

generate, using the signal generator, a first z-axis data signal containing first z-axis data corresponding to a location of the z-axis data updating system, based on current z-axis data obtained from at least one of the z-axis data source or the data storage system; and send, using the transceiver, a first z-axis data signal to a voice over Internet protocol ("VoIP") telephone that is proximate to the z-axis data updating system, for transmission as a second z-axis data signal via the VoIP telephone over a VoIP connection over a network to a 911 or E911 address database system for decoding the second z-axis data signal to obtain the first z-axis data and for updating a first 911 or E911 address with the first z-axis data, the first 911 or E911 address being associated with a telephone number of the VoIP telephone.

19. The z-axis data updating system of claim 18, further comprising one of a user device running a z-axis data updating software application ("app"), a z-axis data updating location beacon, or a portable z-axis data updating device, wherein the user device includes one of a smart phone, a tablet computer, or a laptop computer, wherein the VoIP telephone includes one of a wired VoIP telephone, a table-top VoIP telephone, a counter-top VoIP telephone, a wall-mounted VoIP telephone, a VoIP conferencing telephone, or a cordless VoIP telephone, wherein the 911 or E911 address database system includes at least one of an emergency call record system, an address validation system, or an interactive voice response ("IVR") system for an address database, wherein the z-axis data source includes one of a geo-location system, an altimeter, a barometer, or an inertial measurement unit ("IMU")-based inertial navigation system, wherein the z-axis data includes at least one of height above ellipsoid ("HAE") data, altitude data, atmospheric pressure data, or altitude data based on tracked motion, acceleration, and orientation.

20. The z-axis data updating system of claim 18, wherein the computing system is further configured to perform at least one of:

sending, to the VoIP telephone, a dial-triggering signal to cause the VoIP telephone to dial a telephone number corresponding to the 911 or E911 address database system, after detecting a dial tone from the VoIP telephone, wherein the dial-triggering signal includes one of a dual-tone multi-frequency ("DTMF") signal or a frequency shift keying ("FSK") signal;

detecting, via the VoIP telephone over the VoIP connection, a ready signal from the 911 or E911 address database system indicating that the 911 or E911 address database system is ready to receive z-axis data, wherein generating and sending the first z-axis data signal are performed after detecting the ready signal; or receiving, via the VoIP telephone over the VoIP connection and from the 911 or E911 address database system, a confirmation signal including second z-axis data, comparing the first z-axis data with the second z-axis data contained in or derivable from the confirmation signal, and performing one of:

based on determination that the second z-axis data contained in or derivable from the confirmation signal matches the first z-axis data, presenting, on a display screen or over a speaker of the z-axis data updating system, a message indicating successful transmission of the first z-axis data; or based on determination that the second z-axis data contained in or derivable from the confirmation signal does not match the first z-axis data, repeating the processes of sending the first z-axis data signal, receiving the confirmation signal, and comparing the first z-axis data with the second z-axis data contained in or derivable from the confirmation signal.

* * * * *